United States Patent [19]
Dachiku et al.

[11] Patent Number: 5,592,228
[45] Date of Patent: Jan. 7, 1997

[54] VIDEO ENCODER USING GLOBAL MOTION ESTIMATION AND POLYGONAL PATCH MOTION ESTIMATION

[75] Inventors: Kenshi Dachiku; Shogo Yamaguchi; Kazuo Ozeki; Katsumi Takahashi; Mitsunori Omokawa; Takaaki Kuratate, all of Tokyo, Japan

[73] Assignee: Kabushiki Kaisha Toshiba, Kanagawa-ken, Japan

[21] Appl. No.: 205,028

[22] Filed: Mar. 2, 1994

[30] Foreign Application Priority Data

| Mar. 4, 1993 | [JP] | Japan | 5-043655 |
| Aug. 23, 1993 | [JP] | Japan | 5-207359 |
| Sep. 28, 1993 | [JP] | Japan | 5-240940 |
| Dec. 27, 1993 | [JP] | Japan | 5-332856 |

[51] Int. Cl.$^6$ .................................................. H04N 7/32
[52] U.S. Cl. ................. 348/416; 348/699; 382/241
[58] Field of Search ...................... 348/699, 700, 348/701, 416, 420, 407, 402, 401, 400, 390, 384; 382/241

[56] References Cited

U.S. PATENT DOCUMENTS

| 4,833,535 | 5/1989 | Ozeki et al. . | |
| 4,951,140 | 8/1990 | Ueno et al. | 348/413 |
| 4,991,009 | 2/1991 | Suzuki et al. | 348/415 |
| 4,996,594 | 2/1991 | Murayama | 348/409 |
| 4,999,705 | 3/1991 | Puri . | |
| 5,025,482 | 6/1991 | Murakami et al. | 382/56 |
| 5,057,940 | 10/1991 | Murakami et al. . | |
| 5,214,721 | 5/1993 | Fukuhara et al. | 382/56 |
| 5,247,590 | 9/1993 | Fukuhara et al. | 382/56 |
| 5,280,530 | 1/1994 | Trew et al. | 348/407 |
| 5,295,201 | 3/1994 | Yokohama | 382/241 |
| 5,323,470 | 6/1994 | Kara et al. | 382/1 |

FOREIGN PATENT DOCUMENTS

| 0542261A2 | 5/1993 | European Pat. Off. . |
| 0561593A2 | 9/1993 | European Pat. Off. . |
| 0586225A2 | 3/1994 | European Pat. Off. . |
| 3-32185 | 2/1991 | Japan . |
| PCT9118478 | 11/1991 | WIPO . |

OTHER PUBLICATIONS

"Motion Displacement Estimation Using An Affine Model for Image Matching", Optical Engineering, Jul. 1991, vol. 30, No. 7.
Signal Processing, Image Communication, vol. 1, No. 2, Oct. 1989, Amsterdam NL, pp. 117–138, "Object–Oriented Analysis–Synthesis Coding of Moving Images", Hans Georg Musmann, Michael Hotter and Jorn Ostermann.
Signal Processing, Image Communication, vol. 3, Nos. 2–3, Jun. 1991, Amsterdam NL pp. 259–274, "1.15 Mbits/s Coding of Video Signals Including Global Motion Compensation", Dirk Adolph and Ralf Buschmann.
IEICE Transactions, vol. E/E75-B, No. 5, Jun. 1992, Tokyo JP, pp. 377–384 "Model–Based/Waveform Hybrid Coding for Low-Rate Transmission of Facial Images", Nakaya et al.
Transactions of the Institute of Electronics, Information and Communication Engineers of Japan, Section E, vol. E74, No. 6, Jun. 1991, Tokyo, Japan, pp. 1582–1592, "Intelligent Image Coding and Communications With Realistic Sensations—Recent Trends—", Harashima et al.

*Primary Examiner*—Tommy P. Chin
*Assistant Examiner*—Bryan S. Tung
*Attorney, Agent, or Firm*—Finnegan, Henderson, Farabow, Garrett & Dunner, L.L.P.

[57] ABSTRACT

A video coding apparatus ensuring a high coding efficiency even at a low bit rate includes a moving object analyzer which extracts a moving part from an input picture signal, analyzes its motion, and outputs a residual signal relative to a reconstruction image and motion parameters. The apparatus further includes a residual coding device for coding the residual signal, a reconstruction device for reconstructing a picture using the motion parameters, and a device that performs a variable length coding of the motion parameters and residual coded information.

3 Claims, 38 Drawing Sheets

Feature point

Feature points

Fig. 11
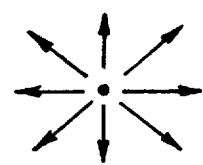
Codes 2,−1,1,0,−1,1
Fig. 12
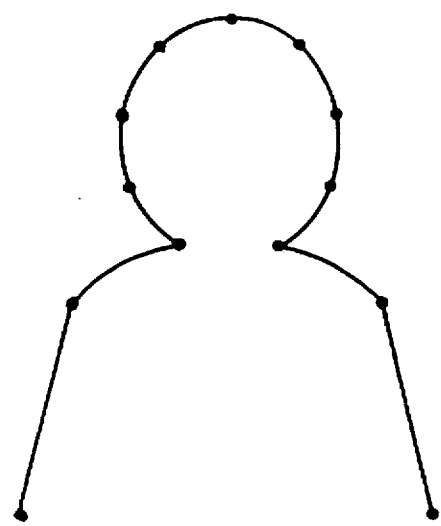

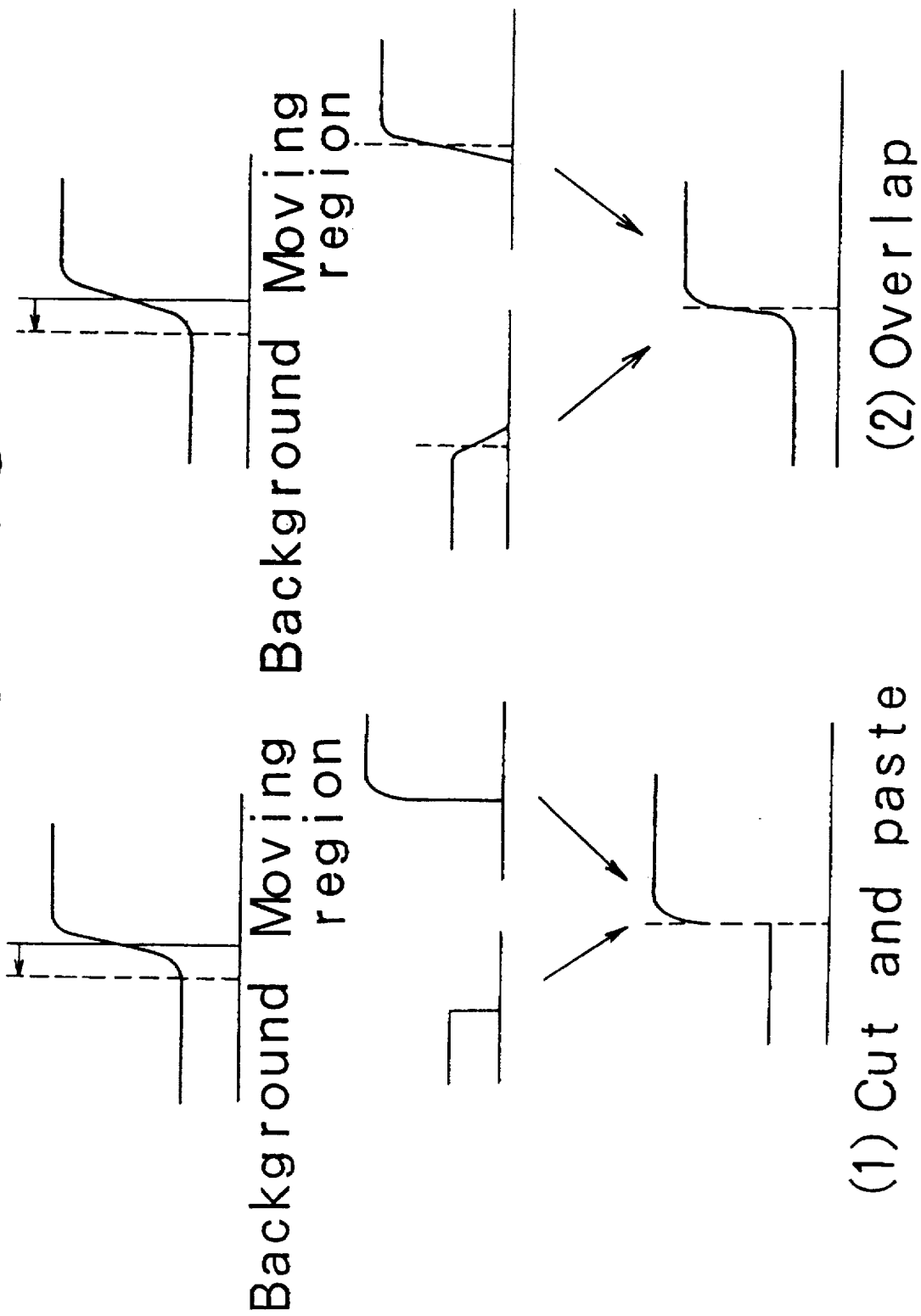

| Number | Adjacent auto-correlation matrices |
|---|---|
| 1 | 2,3,4,5,6,7 |
| 2 | 1,3,7,11 |
| 3 | 1,2,4,10,11 |
| 4 | 1,3,5,8,9,10 |
| 5 | ... |
| ... | ... |

Fig. 35

| Number | Auto-correlation matrices to be searched |
|---|---|
| 1 | 1,2,3,4,5,6,7,8 |
| 2 | 2,3,4,5,6,7,8 |
| 3 | 3,4,5,6,7,8,9,10,11 |
| 4 | 1,2,3,4,12,13,14,15 |
| 5 | : |
| : | : |

VIDEO ENCODER USING GLOBAL MOTION ESTIMATION AND POLYGONAL PATCH MOTION ESTIMATION

BACKGROUND OF THE INVENTION

1. Technical Field

This invention relates to video encoding and decoding apparatuses and a motion estimation apparatus for use in video motion compensated interframe predictive coding.

2. Prior Art (1) Video Encoder and Decoder

The video coding technology has been utilized in the following picture communication, broadcasting and storage applications.

1) Transmission of still pictures, for example in facsimile telegraphy, at the highest possible speed through picture coding 2) Transmission of motion pictures in video conferencing, videophone and other fields within the narrowest possible band and/or the lowest possible bit rate by the utilization of picture coding 3) Recording of picture information in a disk or memory for the most efficient storage of as much image data as possible through picture coding.

The block diagram of the conventional video encoder is presented in FIG. 43.

As shown, an input picture signal is divided into a plurality of blocks and a motion vector indicating the motion relative to the picture of the preceding frame is estimated on a block-by-block basis. Using this motion vector, the preceding frame picture is subjected to motion compensation and the difference from the input picture is extracted. This differential signal is subjected to discrete cosine transform (DCT), quantization and variable length coding and, then, outputted.

As suggested by the use of DCT, the conventional transform encoder employs a single transform routine (transform matrix) on the assumption that the video image is stationary. Moreover, even in the variable matrix adaptive Karhunen-Loeve (KL) transform coding apparatus employing a plurality of transform matrices which are selectively accessed, technologies with poor operational efficiencies such as the method involving a total search for selecting one transform matrix for a fixed quantization procedure have been explored and there has been no optimal coding apparatus for video information. Furthermore, as the technology for selecting the optimum transform from among a plurality of available KL tranforms, the technique using distances in the auto-correlation matrix space of the input signal and the technique assuming the perpetual existence of directionality in images have been available but since these techniques are not optimal from the standpoint of minimizing the coding error, a degradation of coding performance has been inevitable.

Meanwhile, even when the optimum transform could be selected in the conventional video coding apparatus illustrated in FIG. 43, motion compensations had to be invariably carried out by parallel shifting with respect to the input video signal on a block-by-block basis and the prediction error transform was carried out for each block. However, because prediction errors cannot be fully transmitted at a low bit rate, a block-shaped distortion takes place to detract from the picture quality. Furthermore, since the background area which appears from behind a moving object cannot be predicted, the coding efficiency is inevitably low.

(2) Video Motion Estimating Apparatus

The high efficiency coding technology for motion pictures was developed to meet the following requirements.

1) To transmit video signals in a situation where the available frequency band will be remarkably limited as it is the case with wireless videophone.

2) To transmit a video image of high picture quality using a communication channel of comparatively narrow band, such as analog channel.

3) To accumulate a longer time series of picture data in a recording medium.

Meanwhile, it is known that a very high correlation generally exists between consecutive video frames and as a technique for high efficiency coding which lands on this characteristic, there is a motion-compensated interframe predictive coding method.

FIG. 43 shows the block diagram of the conventional motion-compensated interframe predictive coding apparatus.

A block motion estimation stage 711 determines a motion vector for the moving region of an input picture.

A motion compensation stage 712 performs a motion compensation of the preceding frame picture according to the motion vector generated as above. The output information is the prediction error and motion vector of the resultant predicted picture.

Therefore, enhancing the coding efficiency of motion-compensated interframe predictive coding is tantamount to enhancing the accuracy of such a predicted picture, and enhancing the accuracy of the predicted picture, in turn, is equivalent to enhancing the accuracy of motion estimation.

The conventional technology for motion estimation can be roughly divided into two methods, namely the block matching method and the gradient method.

In the block matching method, a motion vector is determined for each of discrete blocks. The sum of pixel value errors between the pixels in the corresponding positions in the block of interest and those in the block of the preceding frame which is shifted by a certain distance is then calculated. Error sums are calculated for various shifts and the shift with the smallest error sum is regarded as the motion vector of the particular block.

This method insures validity within the range of search of motion vectors.

However, in the motion estimation by this block matching method, only parallel motions are taken into consideration. Thus, motions not parallel, such as a rotation, elongation/contraction, or deformation cannot be estimated. Moreover, because it involves a total search for motion vector candidates within the estimation range, a time-consuming operation is required.

The gradient method was proposed as a technique for determining the motion vector for each pixel. It is known that the motion vector (Vx, Vy) of a point (x, y) on the picture is approximated by the following equation.

$$Ex \cdot Vx + Ey \cdot Vy + Et = 0$$

where Ex and Ey represent space gradients in x and y directions, respectively, and Et represents the gradient in the direction of time axis. All of these values can be easily calculated by difference calculus.

By way of illustration, when a pixel of interest in the current frame 713 is represented by a closed circle as in FIG. 44, the difference of its density from that of a pixel situated in the x direction (an open circle) and from that of a pixel situated in the y direction (an open circle) can be expressed as Ex and Ey, respectively.

Moreover, when the pixel in preceding frame 714 which is situated in the position corresponding to said pixel of interest is represented by a closed circle (x', y'), the difference in density between this pixel value and the pixel value of the pixel of interest in the current frame 713 can be expressed by Et.

In this manner, one Et is determined for each pixel of interest and (Vx, Vy) are determined by varying Ex and Ey in the X and Y directions, respectively, in such a manner that the right-hand term of the above equation will become equal to zero.

Because motion estimations are thus performed for respective pixels, this gradient method is able to take care of rotation, elongation/contraction, etc., not limited to parallel motions. However, because the density value of each pixel is employed, the influence of noise is inevitable and, moreover, because only local gradients are taken into account, the method has the disadvantage that it cannot deal with large motions. Therefore, an attempt has been made to apply the gradient method to large regions such as blocks in lieu of individual pixels but the motion estimation is then limited to parallel motions.

OBJECTS OF THE INVENTION

(1) Video Encoder and Decoder

In the conventional video coding method, motion compensation is carried out by parallel shift for each block. Therefore, when a block extends into both the still region and the moving region, the available choice is either to make a parallel shift in conformity with the moving region or do so in conformity with the still region. In either case, the differential signal in one of the two regions is increased. Moreover, in the case where the subject changes its shape as it is the case with the eyes and mouth of a character, too, no sufficient motion compensation can be made by the mere parallel shift of the block. The same applies when the subject makes a spin or is increased or decreased in size as the result of zooming of the camera.

The first invention, which has been accomplished by the present inventors to overcome the above-mentioned disadvantages, has for its object to provide a video encoding apparatus which is able to make a sufficient compensation for the subject's motion to insure a high coding efficiency.

The second invention has for its object to provide a video decoding apparatus which decodes the data encoded by the apparatus of the first invention.

It should be noticed that in the conventional video encoder described so far, the optimum matrix selection method has not been available even when a plurality of transform matrices are available and, moreover, because of its inability to preclude said block-like distortion and to deal with a sudden uncovering of the background, the coding efficiency is inevitably low.

The object of the third and fifth inventions is to provide video encoding apparatuses with a high coding efficiency which is not only able to select the optimum matrix from among a plurality of transform matrices but capable of dealing with said block-like distortion and sudden appearance of the background.

The object of the fourth and sixth inventions is to provide video decoding apparatuses for decoding the data respectively encoded by the above apparatuses.

(2) Video Motion Estimating Apparatus

The conventional block matching method deals with parallel motions only and requires a time-consuming operation and the conventional gradient method is also disadvantageous in that it is subject to the influence of noise and cannot deal with large motions.

The object of the seventh invention is to provide a video motion estimating apparatus with which, in the moving region of a video signal, not only parallel motions but also a variety of other motions such as rotation, elongation or contraction, can be accurately and efficiently estimated.

SUMMARY OF THE INVENTION

The video encoding apparatus according to the first invention comprises a video encoding apparatus comprising a moving object analyzing means for extracting a moving object from an input video signal, analyzing its motion and outputting a residual signal relative to a reconstruction picture and motion parameters, a residual coding means for encoding said residual signal from said moving object analyzing means to form an encoded residual data, a reconstruction means for reconstructing a picture image using said motion parameters from said moving object analyzing means and said encoded residual data from said residual coding means, and a variable length coding means which performs a variable length coding of said motion parameters from said moving object analyzing means and said encoded residual data from said residual coding means, wherein said moving object analyzing means comprising a global motion estimating means for estimating a global motion parameter of the moving region within the input picture, a polygonal patch motion estimating means for estimating polygonal patch motion parameters by applying polygonal patches to the moving region within the input picture or reconstructed picture, and a motion compensating means for performing a motion compensation of the reconstructed picture using the global motion parameter estimated by said global motion estimating means and the polygonal patch motion parameters estimated by said polygonal patch motion estimating means.

Thus, since the moving region is extracted from the input picture signal and a motion compensation is performed selectively for that region in the above manner, the efficiency of motion compensation around the contour of a moving object is improved. Moreover, by applying polygonal patches to the moving region to estimate fine motions, a motion compensation can be made for the deformation of the eyes and mouth.

The video decoding apparatus to which the second invention is directed comprises a variable length decoding means for receiving variable length-coded data, decoding the coded data and resolving it into a global motion parameter, polygonal patch motion parameters and a residual code, a residual code decoding means for decoding the residual code from said variable length decoding means and outputs a residual signal, a global motion compensating means for performing a motion compensation of the entire moving region using the decoded picture of a preceding frame stored in a frame memory and the global motion parameter output from said variable length decoding means and outputs a global motion compensated image, a polygonal patch compensating means for performing a local motion compensation within the moving region using the global motion compensated image output from said global motion compensating means and the polygonal patch motion parameter output from said variable length decoding means and outputs a motion compensated prediction image, and an adding means for adding the motion compensated prediction image from said polygonal patch compensating means and the residual code output from said residual code decoding means to construct a decoded picture and outputs the decoded picutre to a frame memory.

The video decoding apparatus thus constructed is capable of decoding the data which has been encoded with a high coding efficiency, sufficiently compensating for the motion of the subject.

The video encoding apparatus to which the third invention is directed comprises a motion compensating means for analyzing a motion based on an input picture signal and a preceding frame picture signal and performing a motion compensation, a subband division means for dividing each of the motion compensated picture signal output from said motion compensating means and said input picture signal into subbands, an adaptive prediction means for selecting a signal for which a residue is to be determined with respect to the subband picture signal corresponding to said input picture signal, a residual coding means for encoding the residue from the signal selected by said adaptive prediction means and an input subband picture signal from the subband division means, and a decoding means for decoding the coded residual signal output from said residual coding means and adds it to the selected signal output from said adaptive prediction means to give a locally decoded subband picture signal, wherein said adaptive prediction means selects said residual signal from among at least an motion compensated subband picture signal, preceding frame locally decoded subband picture signal and no signal.

The above video encoding apparatus is capable of making a sufficient compensation for the motion of a subject and through segmented signal processing in subbands, provides for a preferential coding of low-frequency signals which are of greater visual importance, thus producing a picture of visually improved quality. Furthermore, this apparatus provides for a still higher coding efficiency by performing a background prediction for the background appearing from behind a moving object.

The video decoding apparatus to which the fourth invention is directed comprises a variable length decoding means for receiving variable length coded data, decoding the coded data and resolving it into motion parameters, an adaptive prediction selection signal and a residual code, a residual decoding means for decoding the residual code resolved by said variable length decoding means, a selection means for generating an adaptive prediction signal, an adding means for adding the residual signal decoded by said residual decoding means and the adaptive prediction signal generated by said selection means to generate a subband decoded image, a frame memory for storing the subband decoded image generated by said adding means, a subband synthesizing means for performing a subband synthesis of the subband decoded image output from said frame memory to generate a base band decoded image, a motion compensating means for performing a motion compensation of the base band decoded image generated by said subband synthesizing means according to the motion parameters resolved by said variable length decoding means, and a subband division means for dividing an output signal of said motion compensating means into subbands and outputs motion compensated subband picture signals, wherein said selection means selecting an adaptive prediction signal at least from among the motion compensated subband picture signal from said subband segregating means, the subband decoded picture signal of a preceding frame from said frame memory and no signal according to the adaptive prediction selection signal resolved by said variable length decoding means.

This video decoding apparatus is capable of decoding data encoded with high coding efficiency through segmental processing in subbands while effecting a sufficient compensation for the motion of a moving object.

The video encoding apparatus according to the fifth invention comprises a prediction means for performing a prediction by taking a difference in time direction of input picture signals, a selection means for selecting one transform from among a plurality of transforms, a transforming means for transforming and quantizing a prediction residual signal from said prediction means according to the transform selected by said selecting means, a coding means for coding and outputting the quantized signal from said transforming means, a dequantizing means for dequantizing the quantized signal from said transforming means and an inverse transforming means for inverse transforming the dequantized signal from said dequantizing means according to a inverse transform corresponding to said selected transform to give a local decoded signal.

The above video encoding apparatus provides for an improved coding efficiency, irrespective of whether for a still picture or a motion picture, through selection of an adaptive KL transform.

The video decoding apparatus according to the sixth invention is a video decoding apparatus which receives a signal composed of variable length-coded data, selection information indicating which transform matrix was selected and motion vector, comprising a variable length decoding means for decoding said coded data, a dequantizing means for dequantizing the signal decoded by said variable length decoding means, a matrix coefficient designating means for designating a matrix coefficient for inverse transform from a set of matrix coefficients in accordance with said selection information, an inverse transforming means for inverse transforming the signal from said dequantizing means using the matrix coefficient designated by said matrix coefficient designating means, a frame memory for reading out a preceding frame picture stored therein beforehand according to said motion vector, a motion reconstruction means for reconstructing a motion of the signal from said frame memory and an adding means for adding the signal from said motion reconstruction means and the signal from said inverse transforming means to construct the current frame picture.

The above video decoding apparatus on mere reception of variable length coded data, selection information on which transform matrix was selected and motion vector can accurately reconstruct the current frame picture.

The video motion estimating apparatus according to the seventh invention comprises a parameter value updating means, for a specific area of a time series of frame pictures, for performing recursive updating to determine parameter values expressing the motion between adjacent frame pictures in said specific area, a parameter updating amount calculating means for determining the amounts of updating of said parameter values based on the motion estimation error for the specific area between the current frame and preceding frame pictures as found with the pre-updating parameter values and the gradients of pixel values for the respective parameters of the current frame picture, and an updating end judging means for causing the updating of the parameter values to end when the result obtained with the parameter values updated by said parameter value updating means has satisfied a predetermined condition.

This video motion estimating apparatus performs a recursive estimation of the values of motion parameters increased to express a complicated motion from the gradient of pixel values relevant to each parameter and the motion estimation error so that a highly efficient and accurate estimation of motion can be accomplished. Furthermore, it is possible to estimate motions in an expanded range by using, as the motion estimation initial value, the value giving the smallest motion estimation error among several predetermined candidate values or changing the motion estimation parameters stepwise according to the characteristic of each parameter. Then, by a recursive determination of the parameter values to be updated from the current gradients of pixel values relevant to the respective parameters and the motion estimation errors, a variety of movements in a specific area within the frame picture can be estimated with accuracy and high efficiency.

BRIEF DESCRIPTION OF THE DRAWINGS

FIG. 11 is a diagrammatic illustration describing the differential chain coding procedure;

FIG. 12 is a diagrammatic representation of the selective transmission of representative points and interpolation between the points for construction of a contour or borderline;

FIG. 13 is a diagram illustrating the method of merging a background and a moving region;

FIG. 32 is a search table;

FIG. 35 is a search table;

DETAILED DESCRIPTION OF THE PREFERRED EMBODIMENTS

(First Invention)

The video encoding apparatus according to one embodiment of the first invention is now described in detail, referring to FIGS. 1–14.

Figure 1:
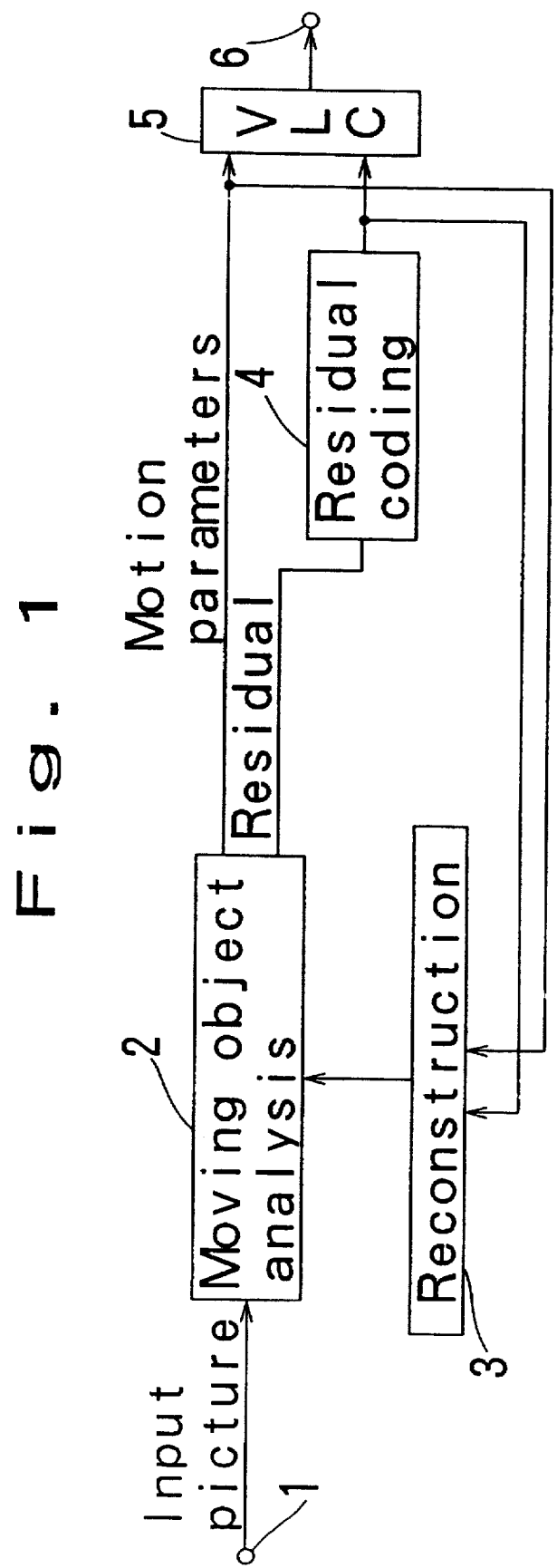
FIG. 1 is a block diagram of the video encoding apparatus according to one embodiment of the first invention.

FIG. 1 is a block diagram of the video encoding apparatus.

The video signal input from an input terminal 1 is divided into a moving region and a still region in a moving object analyzer 2 where extraction of the moving region and estimation of motion parameters are carried out. Motion compensation of a reconstructed picture with the motion parameters is then carried out and the difference from the input picture is taken. This residual signal is coded in a residual coding stage 4. The motion parameter information and encoded residual information are converted to variable length codes in a variable length coding (VLC) stage 5 and outputted. Moreover, based on the motion parameter information and encoded residual information, a picture is reconstructed in a reconstruction stage 3.

The residual coding stage 4 may be any apparatus that insures an efficient expression of waveforms. For example, a conditional replenishment apparatus which quantizes the residual signal and transmits any pixel value not equal to 0 with attachment of an address and an apparatus which performs a vector quantization expressing several pixels as a cluster by one code or a discrete cosine transform and subsequent quantization for transmission can be employed.

Figure 2:
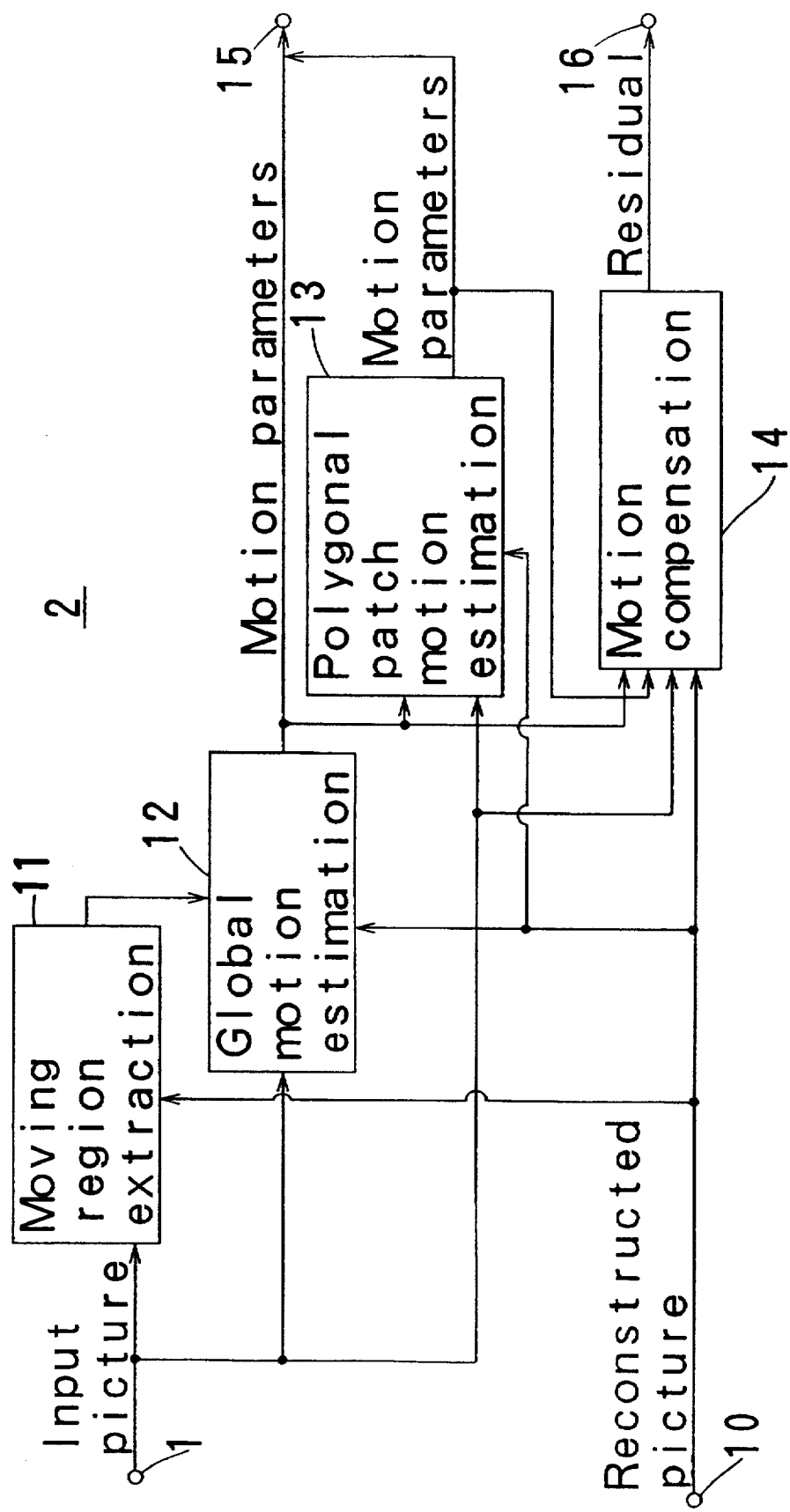
FIG. 2 is a block diagram showing an example of the moving picture analyzing stage of the first invention.

FIG. 2 is a block diagram showing an example of the moving object analyzer 2.

The picture signal input from an input terminal 1 is subjected to extraction of a moving region in a moving region extraction stage 11. In a global motion estimation stage 12, the motion parameter of the whole moving region is estimated. Then, in a polygonal patch motion estimation stage 13, polygonal patches are applied to the moving region for the estimation of fine motions within the moving region. Using the global motion parameter and polygonal motion parameter, a motion compensation stage 14 performs a motion compensation of a reconstructed input picture from an input terminal 10. The difference between the input picture and the motion-compensated picture is taken and outputted as a residual signal from an output terminal 16.

The method of extracting the moving region in the moving region extraction stage 11 may comprise taking a time-wise difference between input pictures, i.e. an interframe difference, and with the pixels whose values are larger than a threshold value being taken as the moving region, performing the elimination of isolated points for removal of noise components and the consolidation of areas to thereby extract the moving region.

Figure 5:
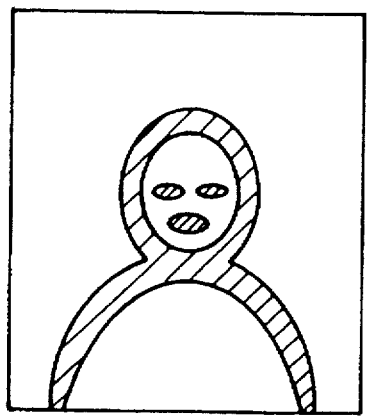
FIG. 5 is a schematic diagram illustrating the extraction of a moving region by elimination of isolated points of interframe difference and regional consolidation.

However, since differences are almost nil in the flat parts of a moving object in this method, the moving region is broken down into many isolated moving areas as illustrated in FIG. 5, with the result that there occurs the problem of an increased number of moving region.

Figure 6:
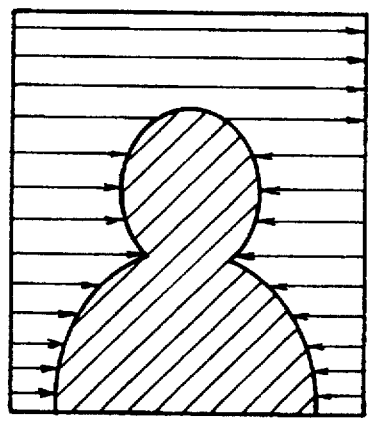
FIG. 6 is a schematic diagram describing the mode of extraction of a moving region using the area within a dynamic border as the moving region.

An alternative method of extracting a moving region comprises, as illustrated in FIG. 6, taking the interframe difference in the first place, searching for the edges of a moving object from both sides and extracting the internal area defined by the edges as the moving region.

In this method, there occurs no division of the moving region. Moreover, a more accurate extraction can be performed by searching for the edges of a moving object from top and bottom as well as from both sides.

Figure 7:
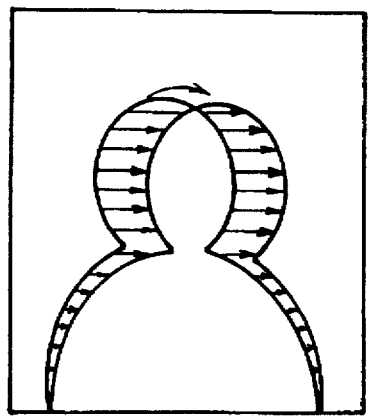
FIG. 7 is a diagrammatic representation of a global motion estimation procedure.

The global motion estimation in the global motion estimation stage 12 performs a mapping of the shift of a given point (x, y) to another point (x',y') as shown in FIG. 7 and represented by the following equation (1) and determines motion parameters a–f.

It should be understood that a–d are parameters representing rotation, enlargement, reduction and deformation, and e and f are parameters representing parallel movements.

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix} \tag{1}$$

Figure 8:
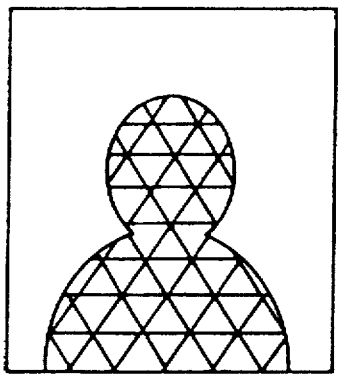
FIG. 8 is a diagrammatic representation of a triangular patch motion estimation procedure.

The polygonal patch motion estimation in the polygonal patch motion estimation stage 13 comprises mapping the picture preceding by one frame with the global motion parameter and applying polygonal patches to the moving region as shown in FIG. 8. Triangular patches are shown in the illustration. The vertices of each triangle are moved so as to minimize the error from the current picture. The image within the triangle is mapped by affine transform. The expression for this affine transform is identical with equation (1). The parameters vary with different triangles. All the information to be transmitted is the amount of shift of each vertex.

When a moving object moves, the condition of impinging light changes so that there may be a difference in luminance value between the corresponding points. To compensate for this difference, the vertices of the triangle must be shifted not only within the two-dimensional plane but also on the luminance scale. Assuming that the amount of luminosity compensation on the luminance scale for the shift of a given point (x,y) to another point (x',y') is z', there holds the equation $$z' = kx + ly + m \tag{2}$$

The parameters k, l and m can be determined from the amounts of shift of the respective vertices of the triangular patch in the direction of the luminance scale.

Figure 3:
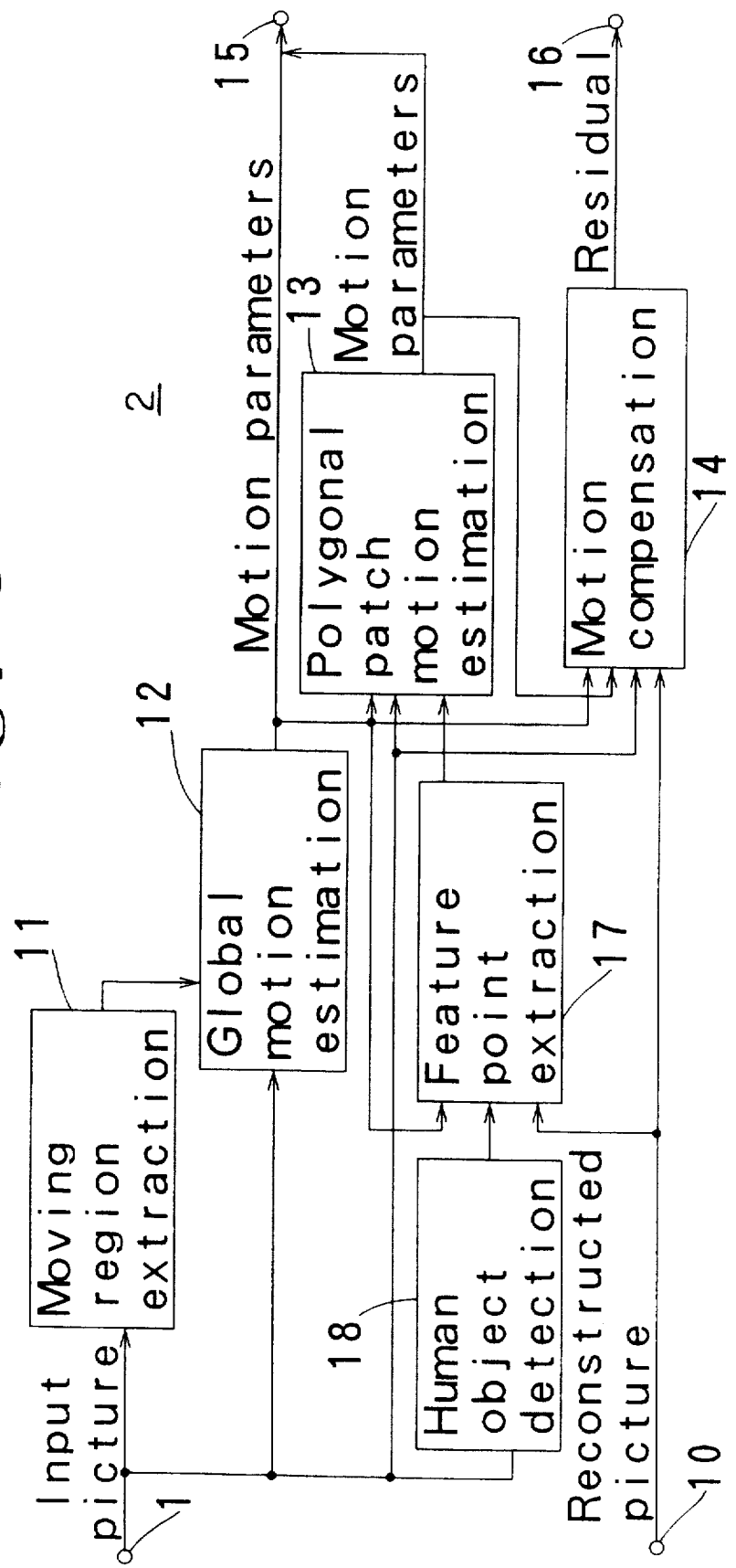
FIG. 3 is a block diagram showing another example of the moving picture analyzing stage of the first invention.

FIG. 3 is a block diagram showing another example of the moving object analyzer 2.

The differences from FIG. 2 is that a feature point extractor 17 and a human object detector 18 are included.

Figure 9:
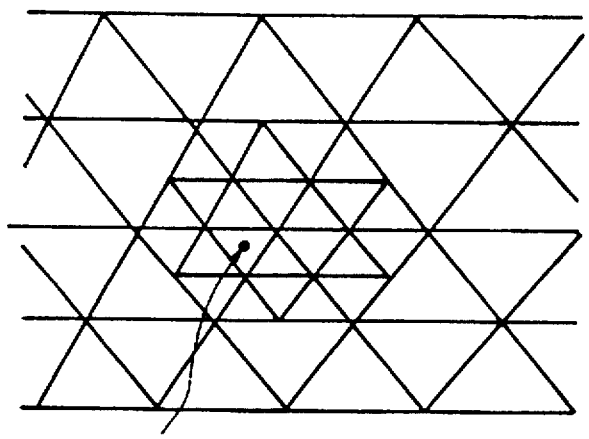
FIG. 9 is a diagrammatic representation of the method of performing a motion compensation by diminishing the size of the triangular patch around a feature point.

The feature point extraction stage 17 extracts feature points such as the eyes and mouth of a human object from the reconstituted picture. For the area around the feature point, the triangular patch is reduced in size to deal with finer motions as shown in FIG. 9.

Figure 10:
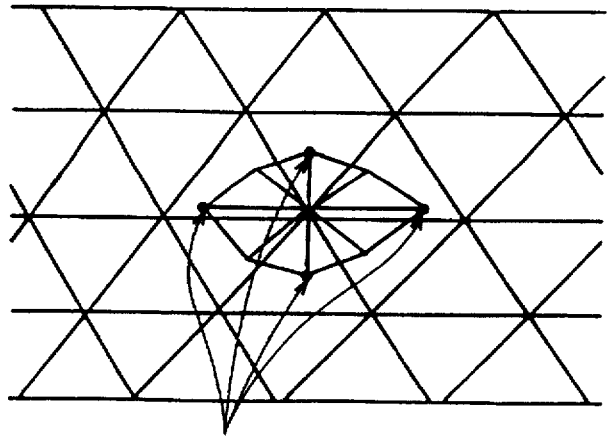
FIG. 10 is a diagrammatic representation of the method of performing a motion compensation by modifying the configuration of triangular patches according to feature points.

An alternative procedure, shown in FIG. 10, comprises applying triangular patches conforming to feature points for motion compensation and then applying triangular patches of fixed shape to make a further motion compensation. While feature points can be extracted from the input picture, extraction from the reconstituted image is more advantageous in that the extraction can be performed at the reception side as well, so that the transmission of topological data on the feature point can be omitted.

This procedure for extracting feature points provides for extraction with high probabilities when modeling is possible to a certain extent as it is the case of a human face but can hardly perform extractions from ordinary scenes. Therefore, an automatic inquiry is made in a character detection stage 18 to find whether the subject of interest is a human object or not, or in the case of ordinary scenes the feature point extraction mode is switched manually to the mode using fixed triangular patches. As a further alternative, a human object encoder and a general image encoder may be provided for selective use.

Figure 4:
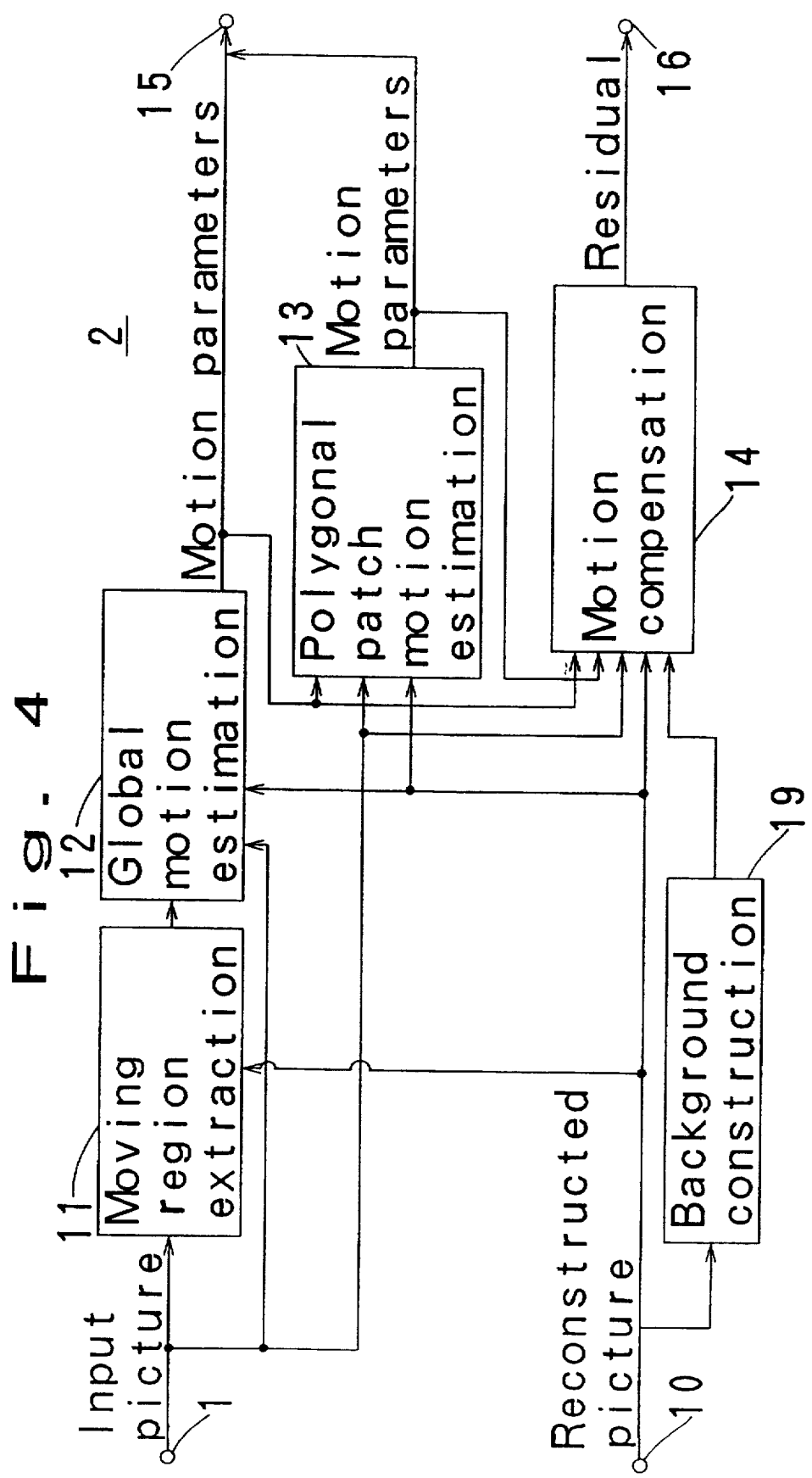
FIG. 4 is a block diagram showing still another example of the moving picture analyzing stage of the first invention.

FIG. 4 is a block diagram showing still another example of the moving object analyzer according to this invention.

The difference from FIG. 2 is that this analyzer includes a background picture construction stage 19.

The pixels standing still for a long time in the reconstructed picture are written into a background memory to construct a background picture. This background picture is used when the background has appeared from behind a moving object. The background which appears from behind the moving object is the area which belonged to the moving region in the preceding frame and has become a still region in the current frame. Since this background compensation area can be recognized on the reception side, too, the transmission of the area information can be omitted.

As a means for transmitting moving region contour information, there is a differential chain code. As shown in FIG. 11, eight allowable directions of movement are numbered and initially a relevant number is transmitted and, thereafter, only the difference from the preceding direction is transmitted. Where a strictly exact contour information need not be transmitted, only the locations of representative points are transmitted and the intervals are interpolated using a curve such as a spline curve as shown in FIG. 12. When this technique is applied to motion pictures, only the amounts of offset of feature points are transmitted so that the data size can be further reduced.

In merging the still region, background compensation region and moving region, cut and paste method is visually unacceptable because the contour is accentuated. FIG. 13 is a one-dimensional representation of background and moving region signals. The background and moving region are interconnected in a smooth line because of the blunting of signals by camera blur and signal processing. If the moving region shifting to the left is cut and pasted to the background, the borderline will be sharp and prominent. Therefore, the signals close to the borderline are gently attenuated and overlapped to achieve a smooth joint.

Figure 14A:
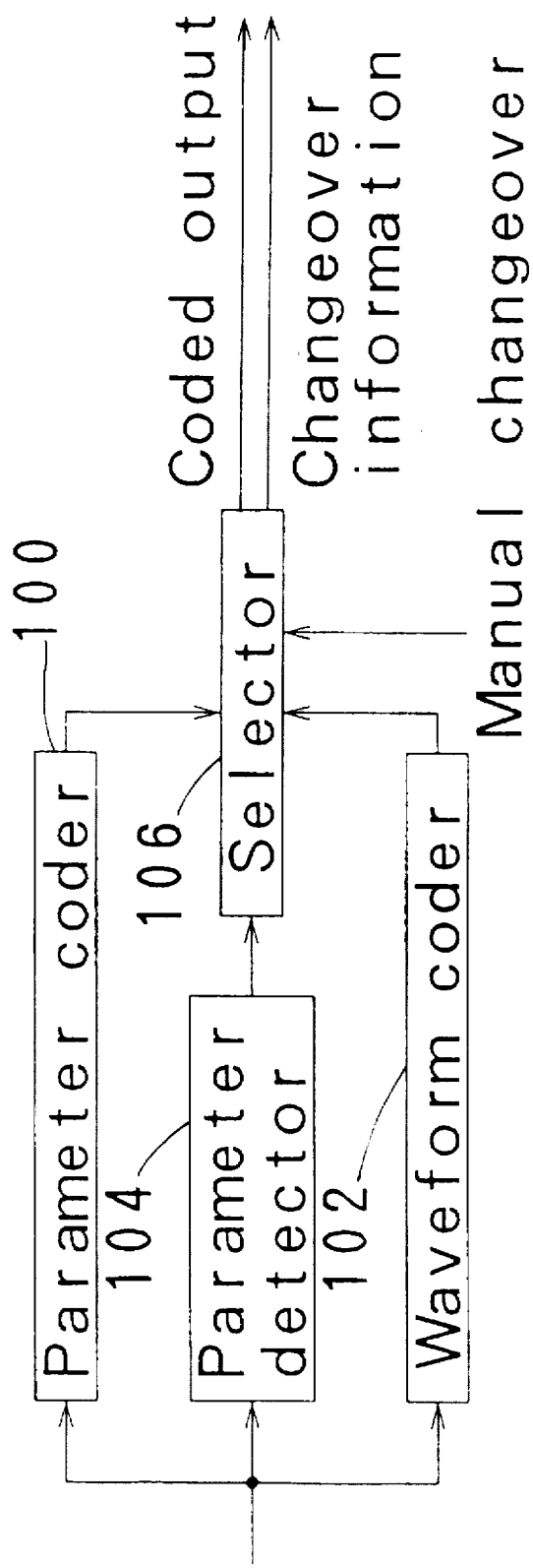
FIGS. 14A and 14B are block diagrams for the transmission of an image of a human face, where (a) represents a transmittor and (b) a receiver.
Figure 14B:
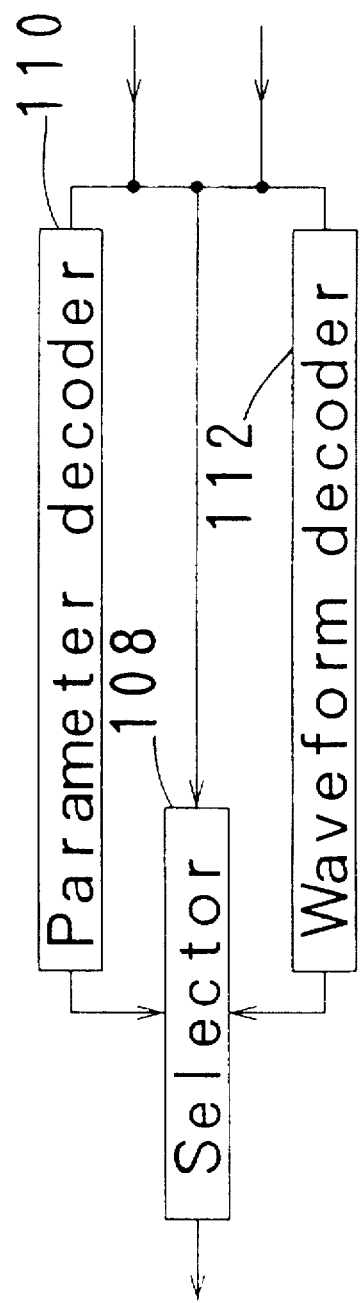

FIGS. 14A and 14B are block diagrams showing the transmission of a picture of the human face, in which (a) represents a transmitter and (b) a receiver.

Referring to the transmitter, the reference numeral 100 indicates a coding stage which is generally called a parameter encoder. It may for example be a coder which segregates the moving region of this invention, a coder which performs a segregation along the contour or profile, a model based coder, an analysis-synthesis coder or an intellectual coder. The reference numeral 102 indicates the conventional waveform coder. The input signal is checked in a parameter detector 104 to see whether it contains the image of a face, for instance, and in a selector 106 stage, a change of mode is performed either automatically or manually. The picture is transmitted through the parameter coder 100 when the image of a face is included and through the waveform coder 102 when such image is not included.

On the receiver side, too, a selector 108 make a change of mode either automatically or manually and the input signal is fed to a parameter decoder 110 when it includes the image of a face or to a waveform decoder 112 when no such image is included.

(Second Invention)

Figure 15:
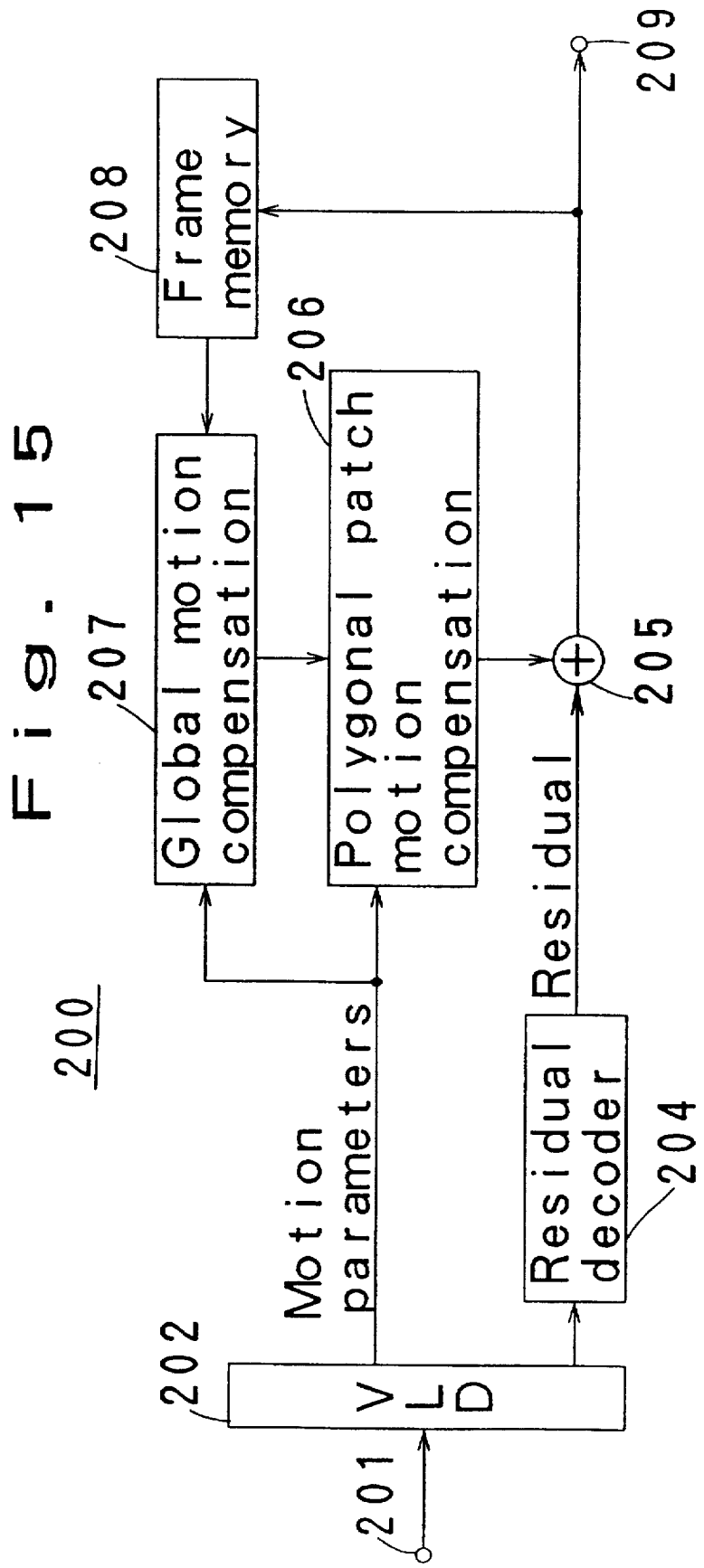
FIG. 15 is a block diagram of the video decoding apparatus according to the second invention.

The video decoding apparatus 200 according to one embodiment of the second invention is now described, referring to the block diagram shown in FIG. 15.

This is an apparatus for decoding the data coded by the video encoding apparatus shown in FIG. 1.

The coded data from the video encoding apparatus is supplied to an input terminal 201 of this video decoding apparatus 200, where the variable length code is decoded in a variable length decoder (VLD) 202, which then outputs motion parameters and a residual code. The motion parameter includes moving region information, global motion parameter and polygonal patch motion parameters.

A residual code decoder 204 decodes the residual code and outputs a residual signal.

A global motion compensation circuit 207 receives the decoded preceding frame picture stored in a frame memory 208, moving region information and global motion parameter and performs a motion compensation of the whole moving region and outputs a global motion-compensated picture.

A polygonal patch motion compensation circuit 206 receives the global motion-compensated picture and the polygonal patch motion parameters, performs a local motion compensation within the moving region and outputs a motion-compensated prediction picture.

An adder 205 adds up the motion-compensated prediction picture and the residual code to construct a decoded picture, outputs the decoded picture from an output terminal 209 and, at the same time, feeds it to the frame memory 208.

In the above manner, the data coded by the video encoding apparatus illustrated in FIG. 1 is decoded.

(Third Invention)

The video encoding apparatus according to one embodiment of the third invention is now described, referring to the drawings.

Figure 16:
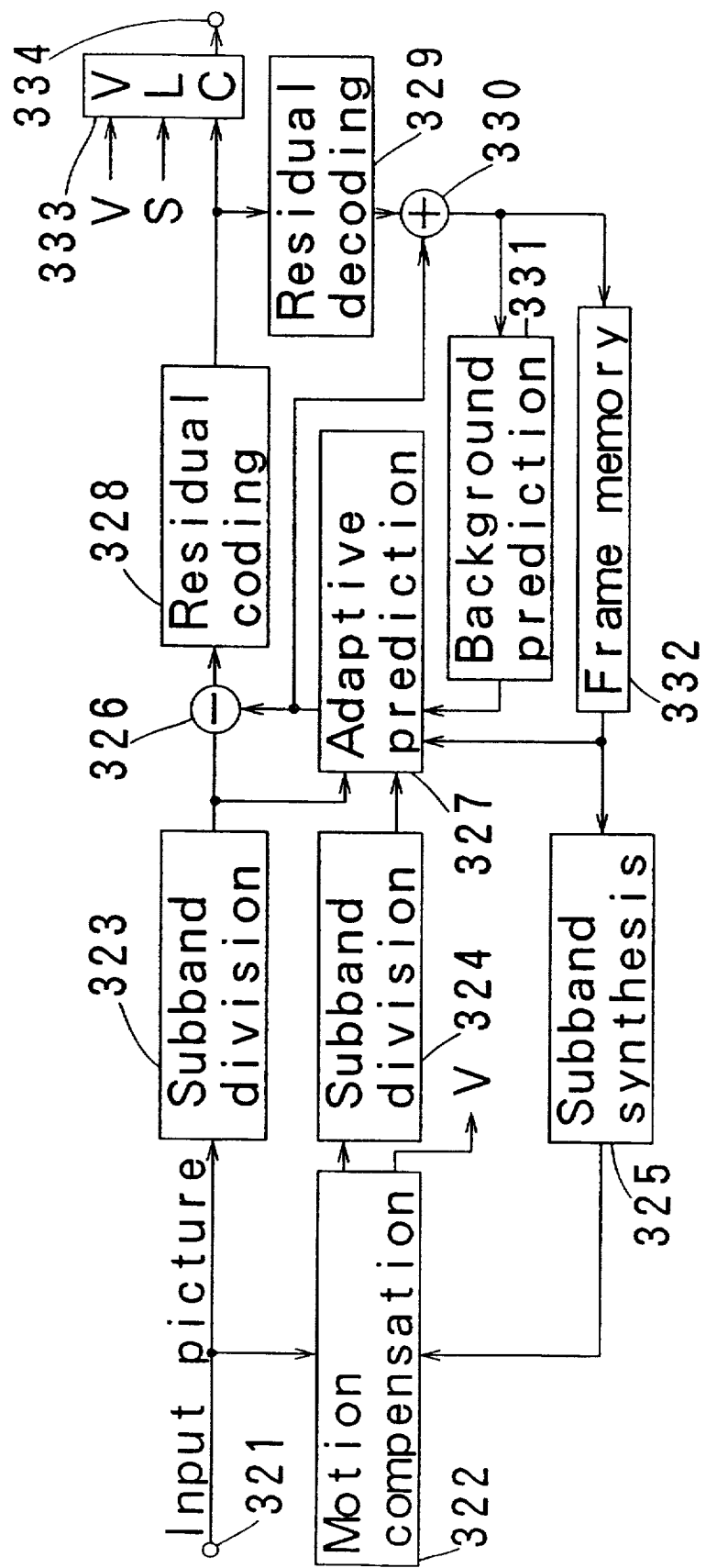
FIG. 16 is a block diagram of the video encoding apparatus according to the third invention.

FIG. 16 is a block diagram showing a video encoding apparatus embodying this invention.

The picture signal input from an input terminal 321 is applied to a motion compensation circuit 322 and a subband division circuit 323.

The motion compensation circuit 322 performs a motion analysis according to the input picture signal and preceding frame picture signal and carries out a motion compensation of the preceding frame picture. The motion analysis can be made by the block matching method which determines the amounts of parallel movements in respective blocks or by the method in which, as described with reference to FIGS. 2–4, the moving region is first extracted to determine the motion of the whole moving region and fine movements are then determined.

The motion-compensated picture signal is divided into a plurality of subbands in a subband division circuit 324 just as the input picture signal.

Figure 17:
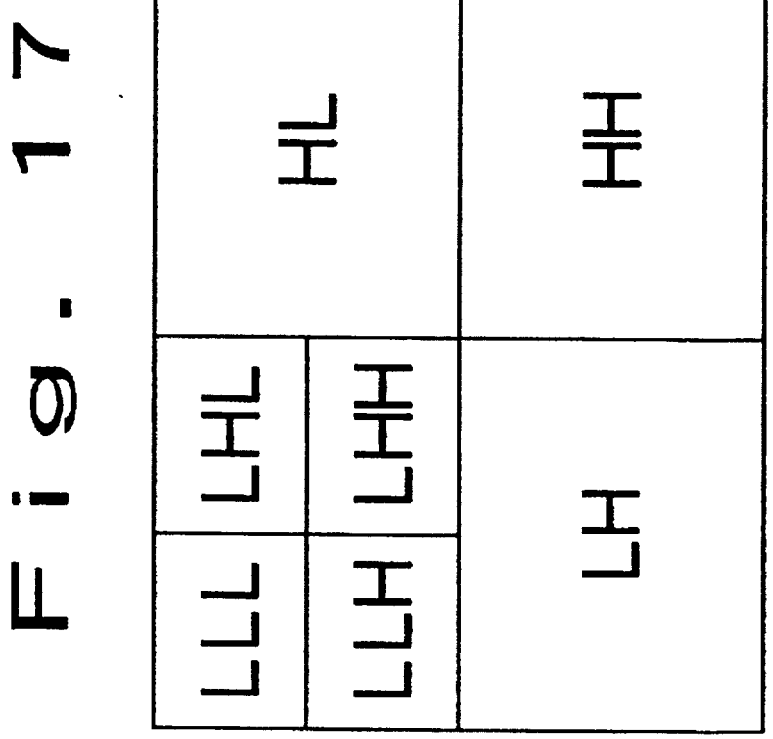
FIG. 17 is a diagram showing a typical segregation of a signal into subbands in accordance with the third invention.

An example of subband division is illustrated in FIG. 17. Thus, the signal is divided horizontally and vertically, each into two frequency bands, viz. LL, HL, LH and HH. And the low band LL is further divided into 4 subbands, viz. LLL, LHL, LLH and LHH.

Then, an adaptive prediction circuit 327 selects one of the motion-compensated subband picture, preceding frame subband picture, background subband picture and no signal and a residual coding circuit 328 encodes the difference between the input subband picture signal and the selected prediction signal.

Then, the coded residual data, adaptive prediction data and motion analysis data are variable-length coded in a variable length coding circuit 333 and outputted from an output terminal 334. At the same time the coded residual data is decoded in a residual decoding circuit 329 and added to the adaptive prediction signal in an adder 330.

The sum signal is applied to a background prediction circuit 331 and a frame memory 332. The background prediction circuit 331 checks the input data to find whether it is relevant to the background or not and accumulates the background portion only.

Referring to the preceding frame subband picture signal output from the frame memory 332, the respective frequency components are synthesized in a subband synthesizing circuit 325 to reconstruct the preceding frame picture.

Figure 18:
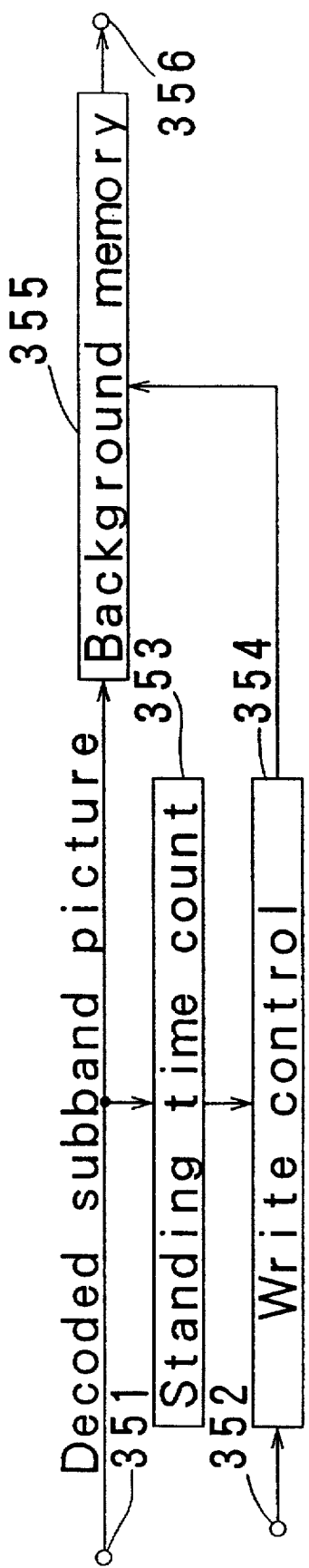
FIG. 18 is a block diagram of the background prediction circuit in the third invention.

FIG. 18 is a block diagram showing an example of the background prediction circuit according to this invention.

The signal subband picture input from an input terminal 351 is fed to a standing-still time counting stage 353 where the standing-still time for each pixel or each block of several pixels is counted. When this standing-still time is over a predetermined time value, a write signal is generated in a write control stage 354 and accordingly the decoded subband picture is written into a background memory 355. The write signal is also generated when the adaptive prediction selection signal input from an input terminal 352 indicates no signal, that is to say in the case of intraframe coding. This is because the intraframe coding mode is selected in the appearance of a new picture signal unpredictable from the past signals and it is highly probable that the portion is a background.

Figure 19:
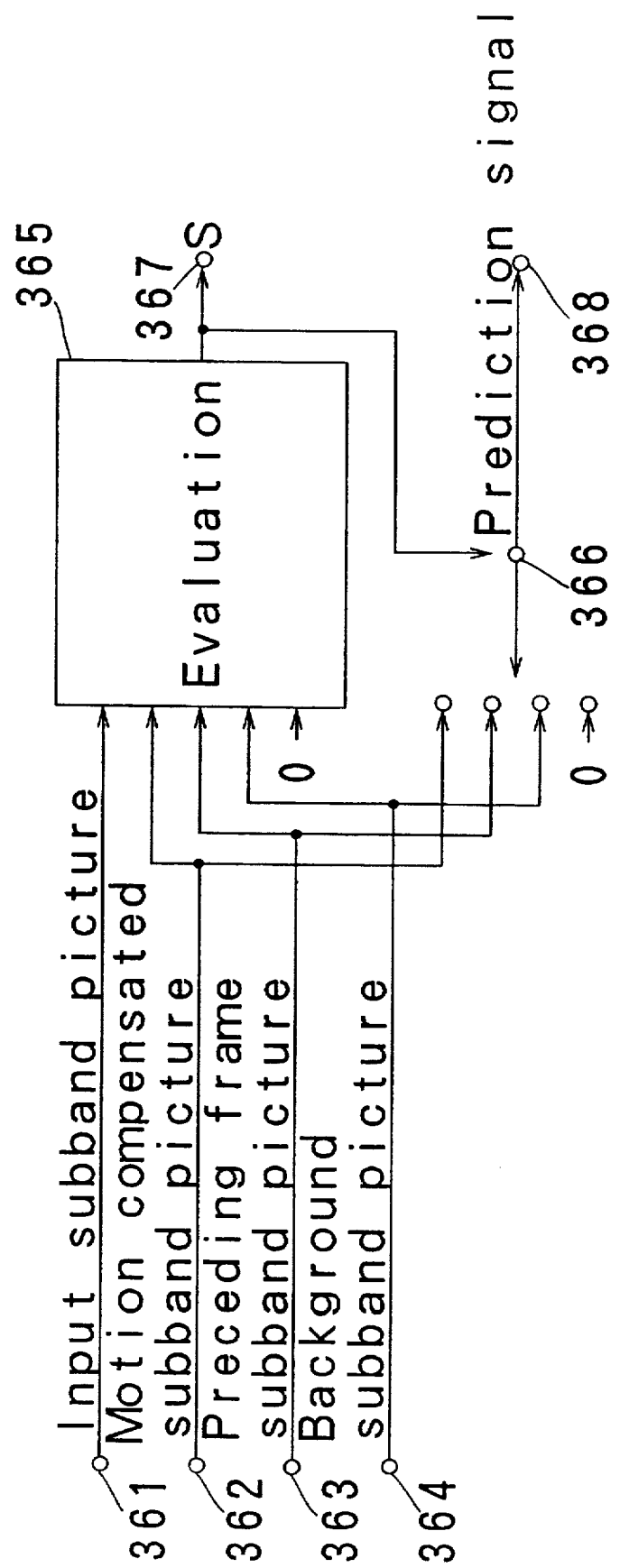
FIG. 19 is a block diagram of the adaptive prediction circuit in the third invention.

FIG. 19 is a block diagram showing an example of the adaptive prediction circuit according to this invention.

The input subband picture is supplied from an input terminal 361, the motion compensated subband picture from an input terminal 362, the preceding frame subband picture from an input terminal 363, and the background subband picture from an input terminal 364, and these inputs are fed to an evaluation circuit 365.

In the evaluation circuit 365, weighting values of the motion-compensated subband picture, preceding frame subband picture, background subband picture and no signal with respect to the input subband picture are calculated. As the weighting value, the sum of differential absolute values or the sum of differential square values is calculated. When the weighting value of the preceding frame subband picture is below a set value, a selector 366 selects the preceding frame subband picture as the prediction signal and this signal is outputted from an output terminal 368. Otherwise, the signal with the smallest weighting value is selected. When no signal is selected, the prediction signal is 0 and intraframe coding is carried out.

Figure 20:
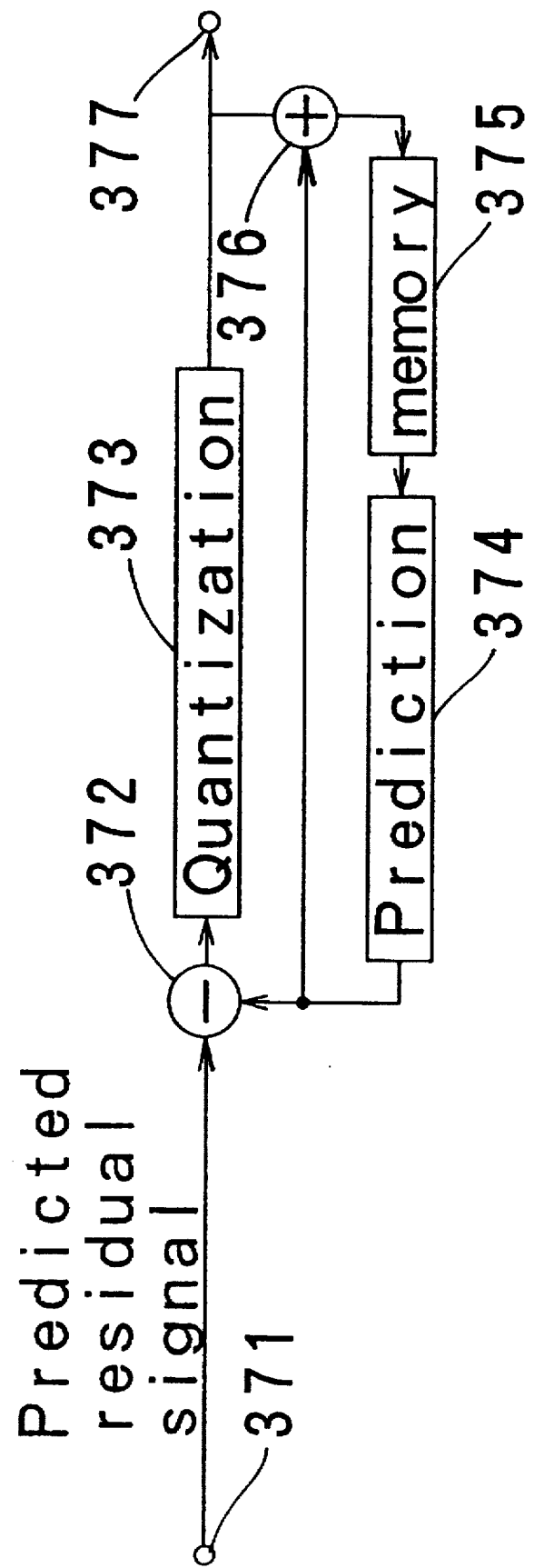
FIG. 20 is a block diagram of the residual coding circuit in the third invention.

FIG. 20 is a block diagram showing an example of the residual coding circuit according to this invention.

The prediction residual signal has substantially no correlation among pixel values but there are cases in which a high correlation remains locally, for example when intraframe coding is selected. By utilizing such a local correlation, the residual signal can be further reduced.

The prediction residual signal input from an input terminal 371 is predicted using the pixels already coded in a prediction stage 374 and the prediction error is quantized by a quantizer 373 and outputted from an output terminal 377.

Moreover, the quantized signal and predicted signal are added in an adder 376 and written into a memory 375 for use in the next pixel prediction.

Figure 21:
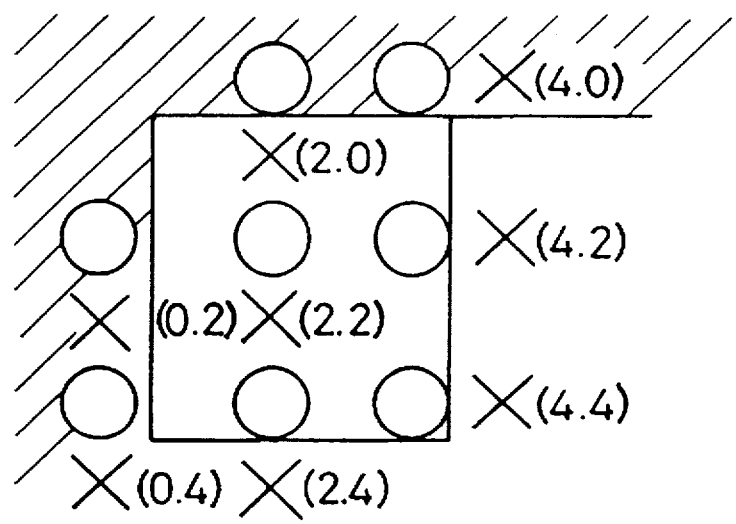
FIG. 21 is a diagrammatic illustration of the residual coding procedure according to the third invention.

FIG. 21 shows a case of processing with a 4×4 block. The shaded area indicates the part which has already been coded.

First, the pixel X (4,4) at right bottom of the block is predicted by means of equation (3) using the pixels already coded and the prediction error is quantized.

$$P(4,4)=(ah(4,4)X(0,4)+av(4,4)X(4,0))/2 \qquad (3)$$

The quantized prediction error is added to the predicted value, whereby X (4,4) is established. Then, pixels X (2,4) and X (4,2) are predicted by means of the following equations (4) and (5) and the prediction errors are quantized.

$$P(2,4)=ah(2,4)(X(0,4)+X(4,4))/2 \qquad (4)$$

$$P(4,2)=av(4,2)(X(4,0)+X(4,4))/2 \qquad (5)$$

Then, pixel X(2,2) is predicted by means of equation (6) and the prediction error is quantized.

$$P(2,2)=(ah(2,2)(X(0,2)+X(4,2))+av(2,2)(X(2,0)+X(2,4)))/4 \qquad (6)$$

In the same manner as above, the intervening pixels are also coded. Here, prediction coefficients ah(i,j) and av(i,j) are determined by interpixel correlations. However, since it is not practical to calculate an interpixel correlation for each input picture, it is recommendable to investigate the interpixel correlation of each band using a standard picture and determine the prediction coefficients from the data.

Figure 22:
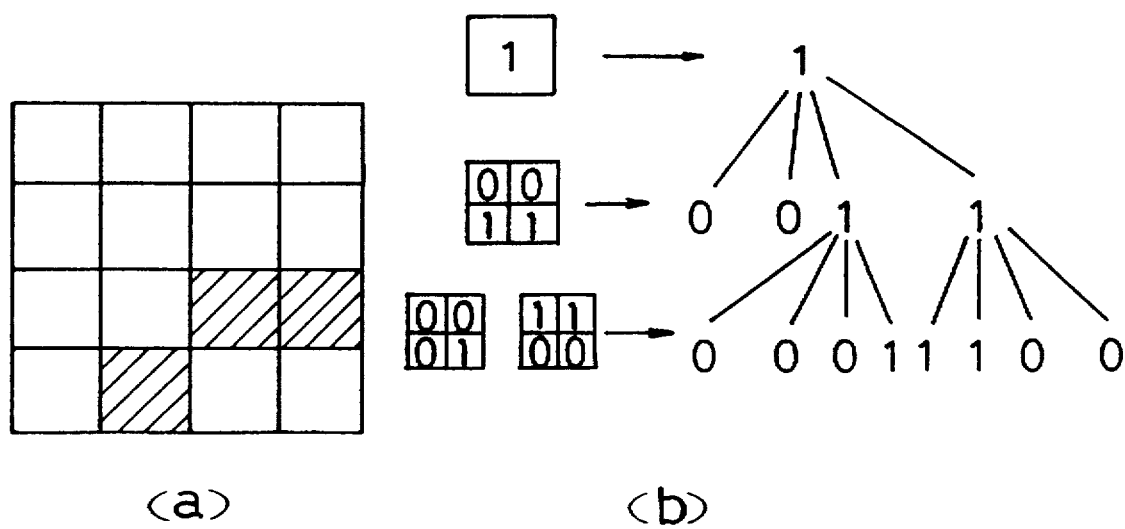
FIG. 22 is a diagrammatic view illustrating the coding of the pixel position where the quantization value is not equal to 0 in the third invention.

The coding of quantized prediction errors can be carried out independently for the case where the quantization value is 0 and for the case where it is otherwise. In FIG. 22 (a), the shaded square represents a pixel with a quantization value not equal to zero. This topological information is expressed as quadtrees as illustrated in FIG. 22 (b) and variable-length coded. And only the quantization values not equal to zero are variable-length coded.

(Fourth Invention)

Figure 23:
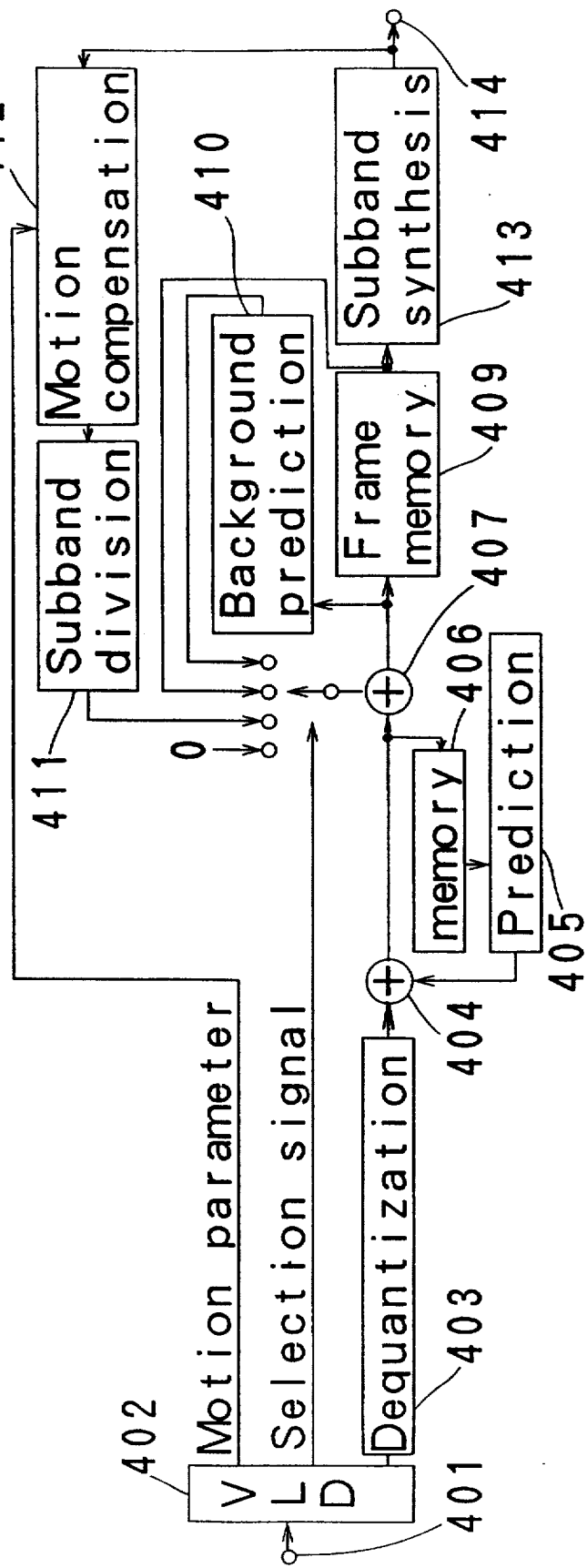
FIG. 23 is a block diagram of the video decoding apparatus according to the fourth invention.

The video decoding apparatus as one embodiment of the fourth invention is now described in detail, referring to the block diagram shown in FIG. 23.

This is an apparatus for decoding the data coded by the video encoding apparatus of the third invention.

The coded data input from an input terminal 401 is fed to a variable length decoder 402 which decodes the variable length code and outputs the motion parameters, adaptive prediction selection signal and prediction error quantized signal.

The prediction error quantized signal is dequantized by a dequantizer 403 and added to the output of a predictor 405 in an adder 404 to generate a decoded residual signal. This decoded residual signal is written into a memory 406 for use in the next prediction of decoded pixels.

The predictor 405 predicts the next decoded pixel using the adjacent already decoded pixels.

A selection circuit 408 responding to the adaptive prediction selection signal selects one signal from among four kinds of signals, namely no signal and the motion compensated subband picture signal, preceding frame subband picture signal and subband background prediction signal which are described in detail hereinafter and outputs it as an adaptive prediction signal.

In an adder 407, the decoded residual signal is added to this adaptive prediction signal from the selection circuit 408 to generate a subband decoded picture. This subband decoded picture is fed to a frame memory 409 and a background prediction circuit 410.

15

The subband decoded picture is written into a frame memory 409.

The background prediction circuit 410 selectively writes the newly supplied part and standing-still part of the subband decoded picture into the background memory which is built in the background prediction circuit 410. And the output subband background prediction signal is applied to the selection circuit 408.

The subband decoded images from a frame memory 409 are synthesized in a subband synthesizer 413 to give a base band decoded picture which is outputted from an output terminal 414. Moreover, this signal is fed as the preceding frame subband picture signal to the selection circuit 408.

The base band decoded picture is motion compensated using motion parameters in a motion compensation circuit 412, divided into subbands in a subband division circuit 411 and applied as motion-compensated sub-band picture signals to the selection circuit 408.

When the video encoding apparatus comprises two compensation stages as illustrated in FIG. 2, viz. global motion compensation and polygonal patch motion compensation, the video decoding apparatus should also have two motion compensation stages.

In the like manner, when the video encoding apparatus is not provided with a background prediction circuit, the video decoding apparatus need not have the corresponding circuit, either.

(Fifth Invention)

First Embodiment

Figure 24:
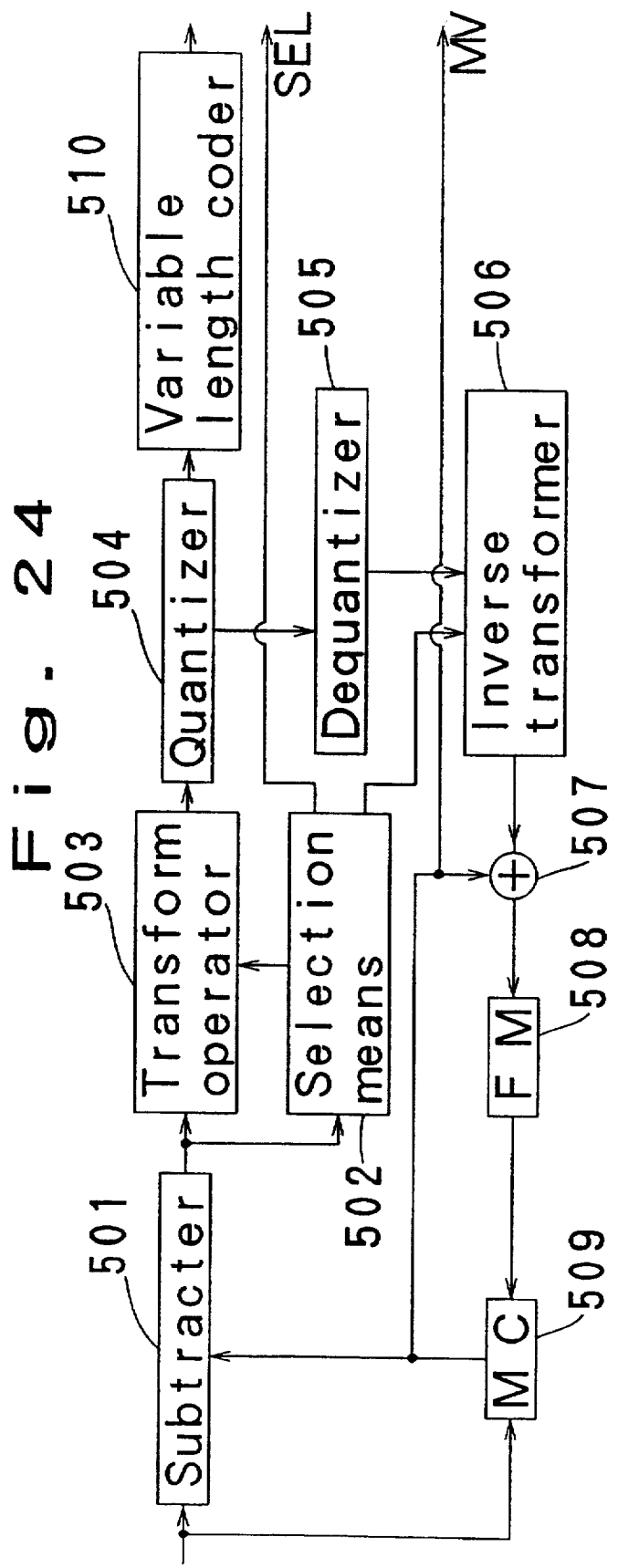
FIG. 24 is a block diagram of a first embodiment of the fifth invention.

FIG. 24 is a block diagram of the video encoding apparatus according to a first embodiment of the fifth invention.

The input picture is subjected to predictive differentiation in a diffenentiator 501 using an interframe or interfield prediction signal prepared in a motion prediction circuit 509 using the past picture data stored in a frame memory 508.

The time-direction prediction is made by a matching search for a block, for example within the range up to 16 pixels×16 lines, which gives the smallest power sum or absolute value sum of prediction differential errors.

The determined motion vector is transmitted to the reception side. A prediction differential signal is selected by a selection means 502 from an available set of orthogonal transforms and the selection information is fed to a transform operator 503. For example, the selection means 502 calculates the auto-correlation maxtrix of an input signal (the prediction residual signal in this case) and performs an operation for selecting the matrix which is closest in euclidean distance from among the auto-correlation matrices corresponding to the available orthogonal transforms. As usual, the picture is divided into small blocks G of N×N pixels, and using the N×N vertical transform matrix Tv and N×N horizontal transform matrix Th, the matrix-transform expressed by equation (7) is carried out.

$$F = T_v G T_h \tag{7}$$

The transformed data is quantized in a quantizer 504 and, if required, variable-length coded in a variable length encorder 510 and outputted.

On the other hand, the quantized data is dequantized in a dequantizer 505.

16

Figure 25:
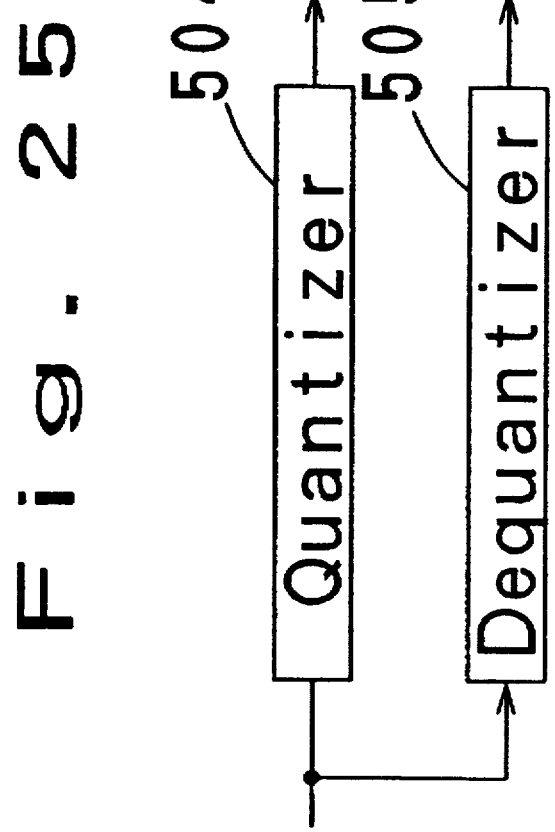
FIG. 25 is a view indicating the locations of the quantizer and dequantizer in the first embodiment of the fifth invention.

In this case, instead of dequantizing such quantized data, dequantized data may be directly generated as illustrated in FIG. 25. As to dequantized data, the operation used in the transform is transmitted from the selection means 502 and the corresponding inverse transforming operation is performed by an inverse transformer 506. The transforms are stored as matrix coefficients in a memory and the coefficient for use in the necessary transform are read out according to a command from the selection means. In this connection, the transform coefficients for the inverse transform procedure can also be read out and sent to the inverse transformer 506. Since this orthogonal transform is an orthonormal transform and the inverse transform is a transposed transform, the coefficients read for transform can be used as they are only by changing the arrangement from vertical to horizontal, thus contributing to a simplified construction.

The result of inverse transform is added to the prediction signal generated by a motion prediction circuit 509 in an adder 507 and the content of a frame memory 508 is updated. The flag signal representing the transform selected by the selection means 502 is fed out along with the above-mentioned quantized and coded signal.

The above-mentioned orthogonal transform is optimized in the case of Karhunen-Loeve (KL) transformation but other approximate orthogonal transforms can also be employed.

Second Embodiment

Figure 26:
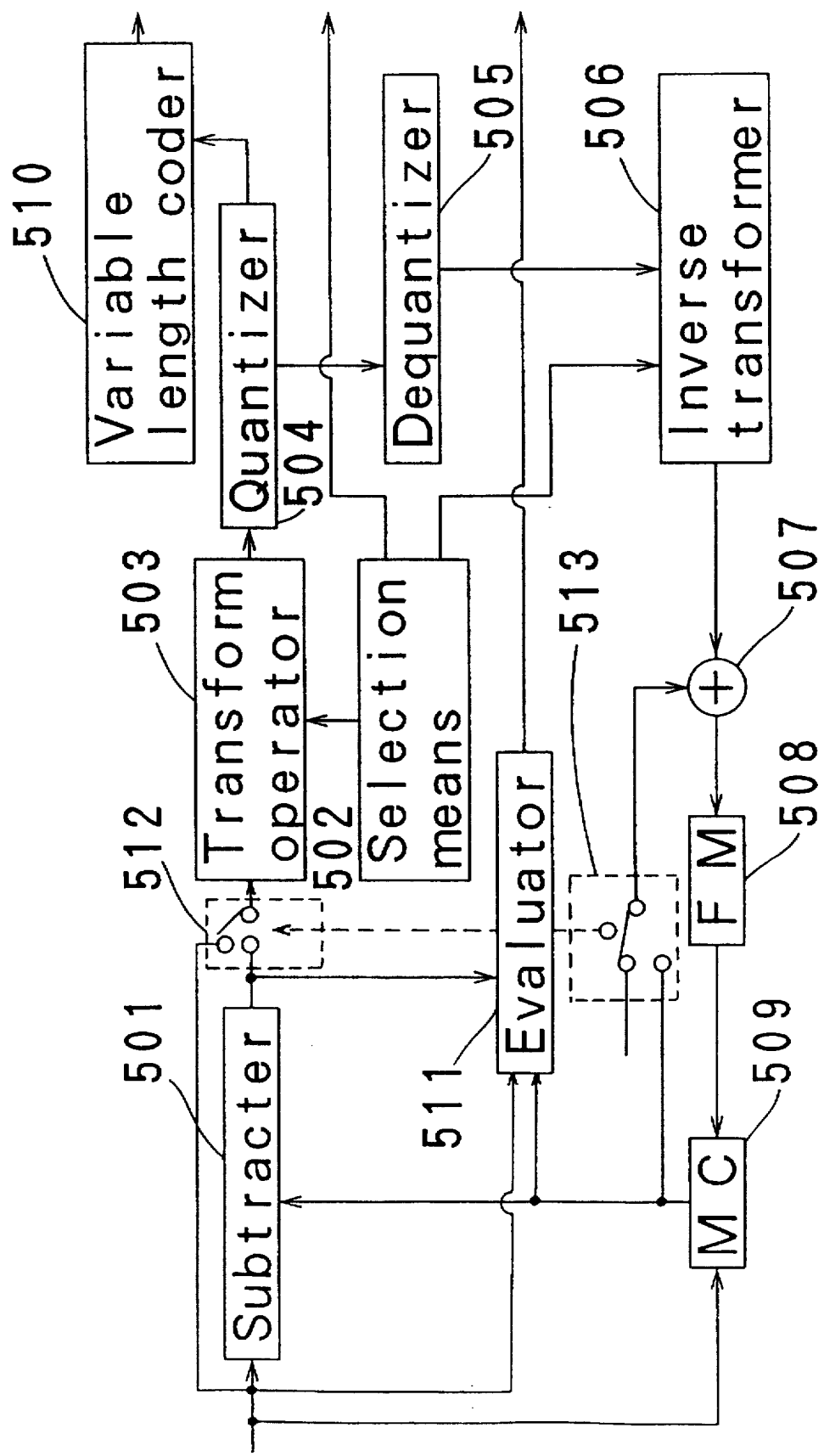
FIG. 26 is a block diagram of a second embodiment of the fifth invention.

FIG. 26 is a block diagram of the video encoding apparatus according to a second embodiment of this invention.

Using the time-direction prediction signal obtained in a motion prediction circuit 509, the prediction residual signal and input signal, a judging means 511 orders a change in coding mode. Thus, the input signal is compared with the power sum or absolute value sum of prediction residual signals and the smaller is selected. A changeover switch 512 performs this change of signal. When the intrablock power sum or absolute value sum of this selected signal is not over a predetermined threshold value, no transform coding is performed and a code indicating this fact is outputted. When said sum is above the threshold value, an adaptive transform is executed and a code indicative of this mode is outputted along with the results of transform, quantization and coding. In this case, a flag signal showing the result of selection of the desired transform from among a plurality of transforms is also outputted.

On the other hand, in local decoding, too, when the input signal instead of the prediction residual signal was selected as the result of the above judgement, a switch 513 adds 0 signal, not the motion compensated prediction signal, to the result of inverse transform.

As to any block in which the input signal power or the like for transform operation is below the threshold value so that no transform coding is carried out, the content of the frame memory 508 is not updated.

Third Embodiment

Figure 27:
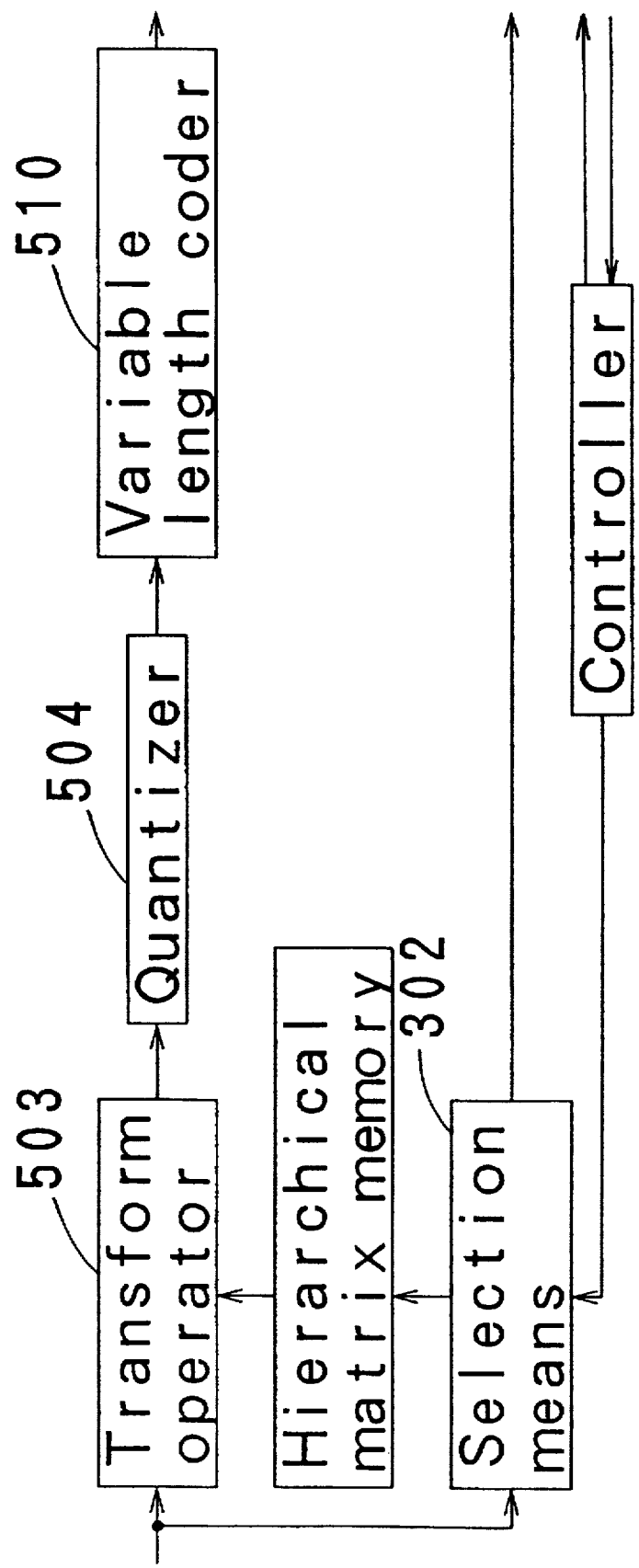
FIG. 27 is a block diagram of a third embodiment of the fifth invention.

FIG. 27 is a block diagram of the video encoding apparatus according to a third embodiment of this invention.

Prior to encoding, the controller of the transmitter communicates with the receiver to make an arrangement on the transforms to be used among the available transforms. By way of illustration, when 16 orthogonal transforms and one DCT, or a total of 17 transforms, are available, there may be cases, for instance, in which all the 17 transforms are employed, only the 16 orthogonal transforms are employed or only the DCT is utilized. It may also be the case that a total of 16 transforms inclusive of one DCT are provided and, according to the circumstances of the hardware, all the 16 transforms, 8, 4 or 2 of them, or only the DCT is selected. Under the circumstances, the efficiency of selection information about which matrices have been selected can be improved by changing the type, number or contents of the transforms initially agreed on.

Fourth Embodiment

Figure 28:
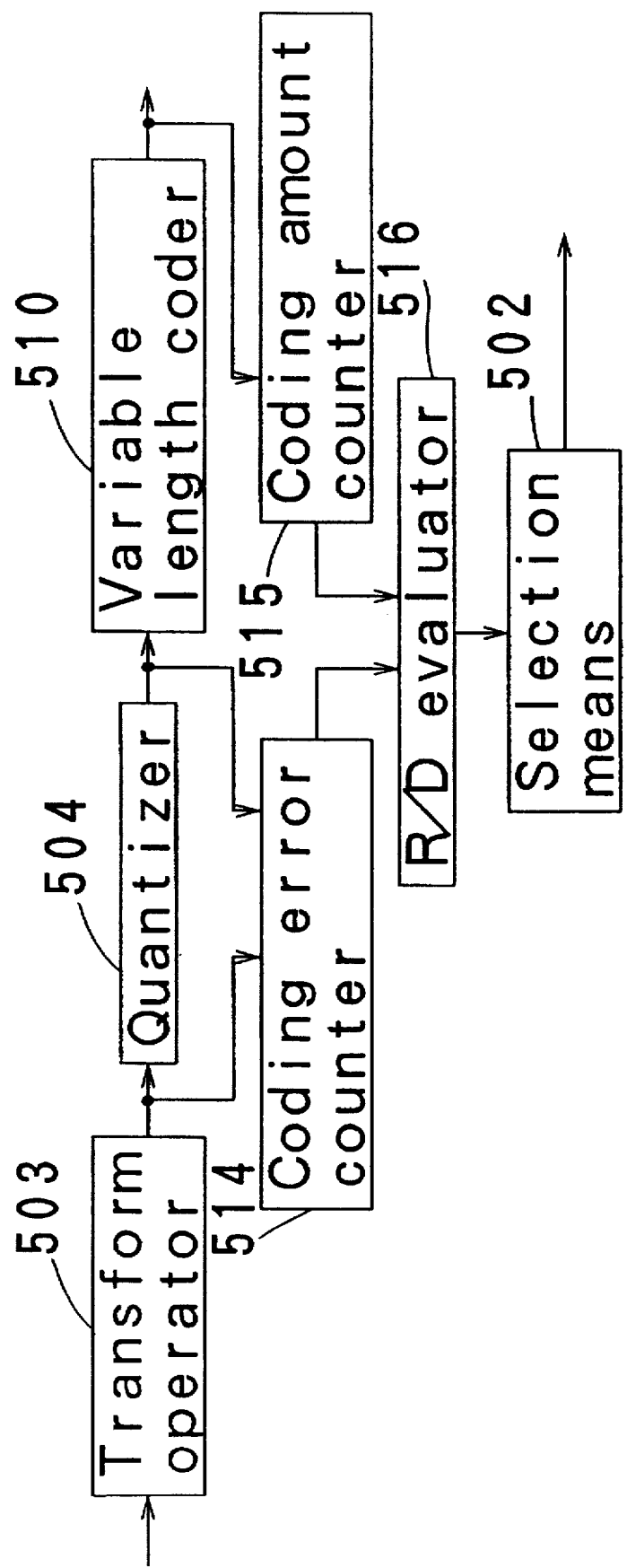
FIG. 28 is a block diagram of a fourth embodiment of the fifth invention.

FIG. 28 is a block diagram of the fourth embodiment of this invention.

In this embodiment, transformations are performed by switching a plurality of transforms from one to another and the transformed information is quantized and variable length coded. The transform which gives the optimum result with maintenance of a predetermined functional relationship between the coding error and quantity of codes is selected and a signal representing this result of selection is also transmitted. This is an apparatus which performs variable matrix adaptive transform, selecting the optimal transform.

Thus, all the available transforms are tried and the most efficient transform is selected.

For this purpose, a coding error coefficient generator 514 compares the data after transformation with the data after quantization and calculates the error.

To be specific, the square sum of the difference between data after transformation and data after quantization for each block is calculated. Then, the code quantity after variable length coding is counted by a counter 515. The error should be as small as possible and the quantity of codes should also be as small as possible. However, they are in conflicting relation and the two must be globally evaluated by an R/D evaluator 516.

Figure 29:
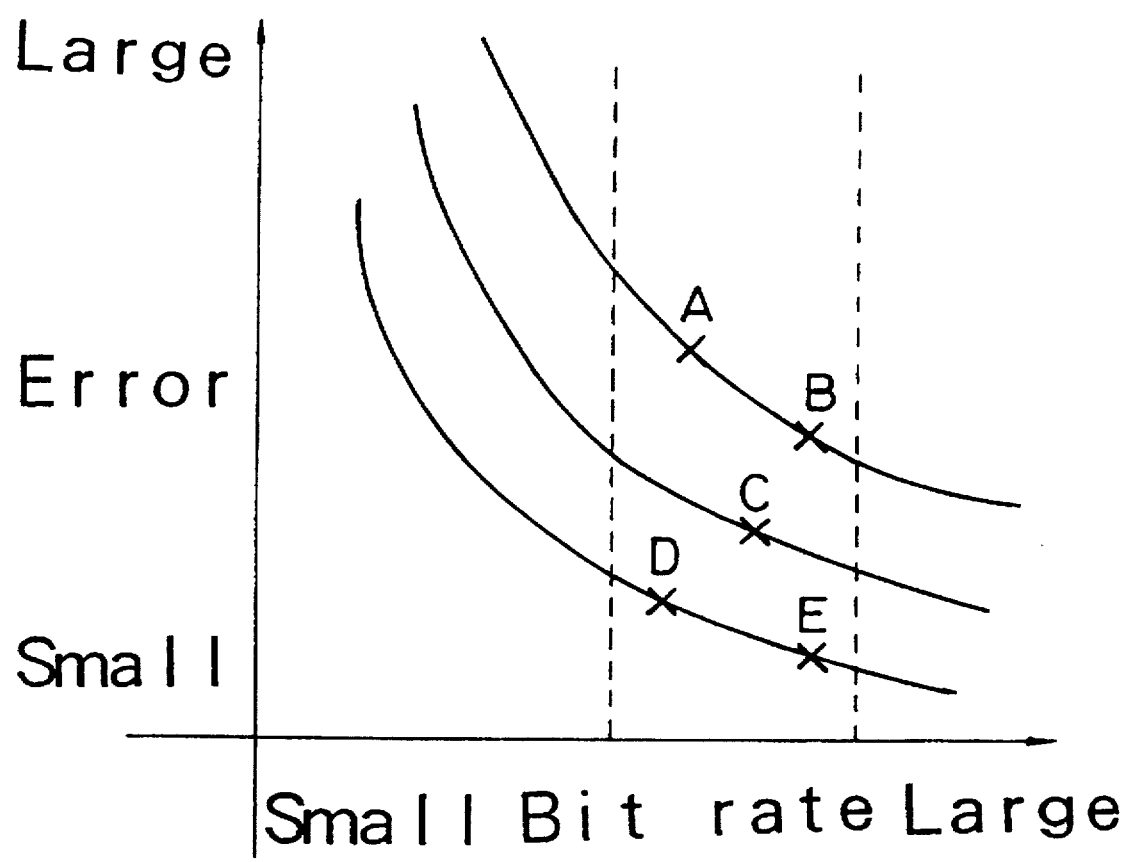
FIG. 29 is a diagrammatic representation of the operating principle of the R/D judging apparatus in the fourth embodiment of the fifth invention.

The operating principle of this R/D evaluator is shown in FIG. 29.

Thus, when the bit rate is plotted on the abscissa and the error on the ordinate and the plots where the bit rate and error are equivalent in efficiency are interconnected, a group of curves as shown in FIG. 29 is obtained. Let it be assumed that A, B, C, D and E are the points on the curves as obtained by entering the data obtained by counters 514 and 515. First, point A and point B are equivalent but the points below them are higher in efficiency because of smaller error values for the same bit rate. Thus, compared with point C, the efficiencies of points D and E are higher. Points D and E are equivalent and, therefore, either of them can be selected. In this connection, a rule may be established beforehand as to which of points D and E should be selected.

It is easy to draw an evaluation map such that priority is given to the rate when it falls within a certain range or priority is given to the rate which is lower or a map reconciling these two rules.

Fifth Embodiment

Figure 30:
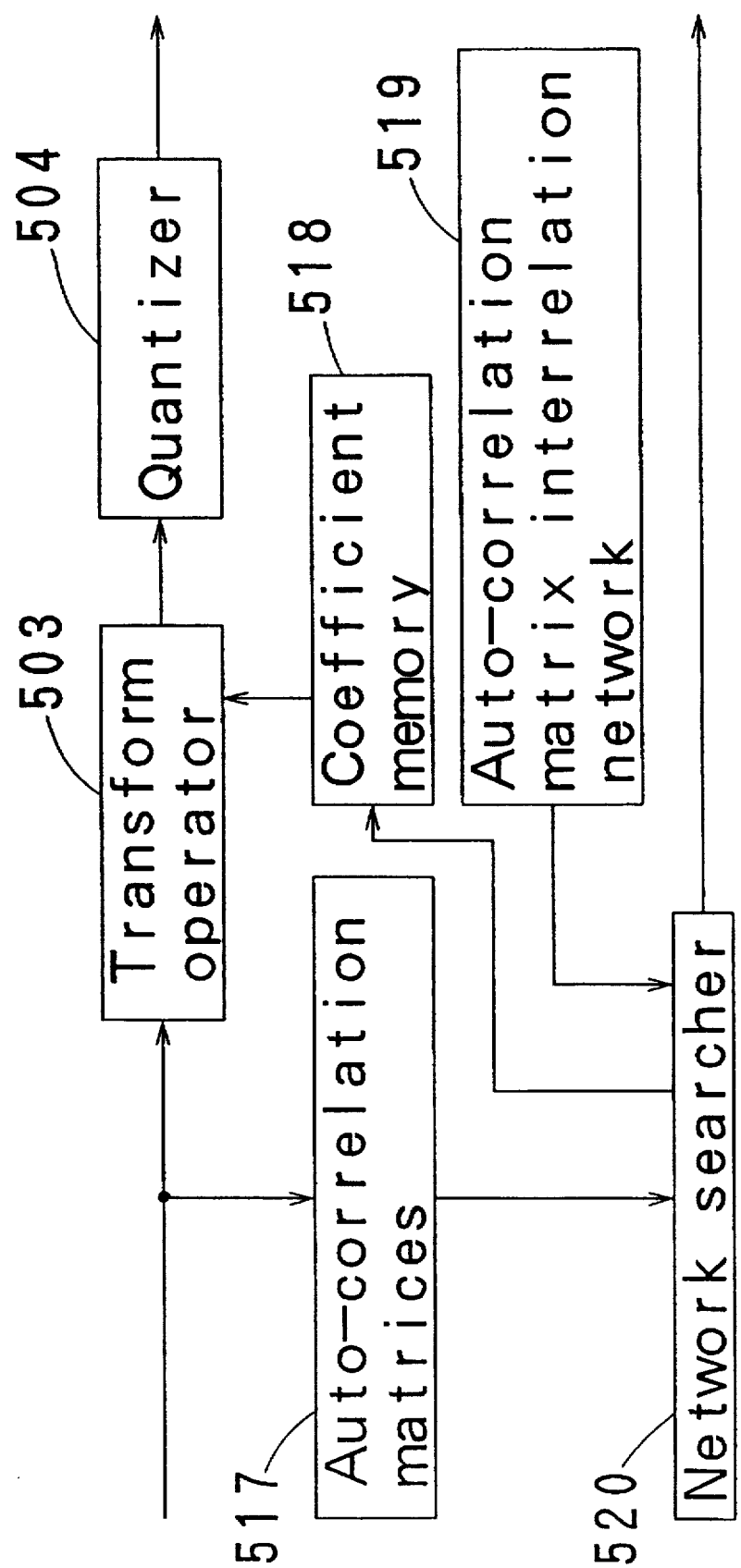
FIG. 30 is a block diagram of a fifth embodiment of the fifth invention.

FIG. 30 is a block diagram of the video encoding apparatus according to a fifth embodiment of this invention.

This apparatus which performs a variable matrix adaptive transform comprises a plurality of auto-correlation matrices corresponding to a plurality of transforms, a distance interrelation network for the auto-correlation matrices and a means for calculating the distance between the auto-correlation matrix of an input picture signal and the auto-correlation matrix corresponding to a given transform, so that a search is made on said distance network for the minimum distance between the auto-correlation matrices of input and transform.

Figure 31:
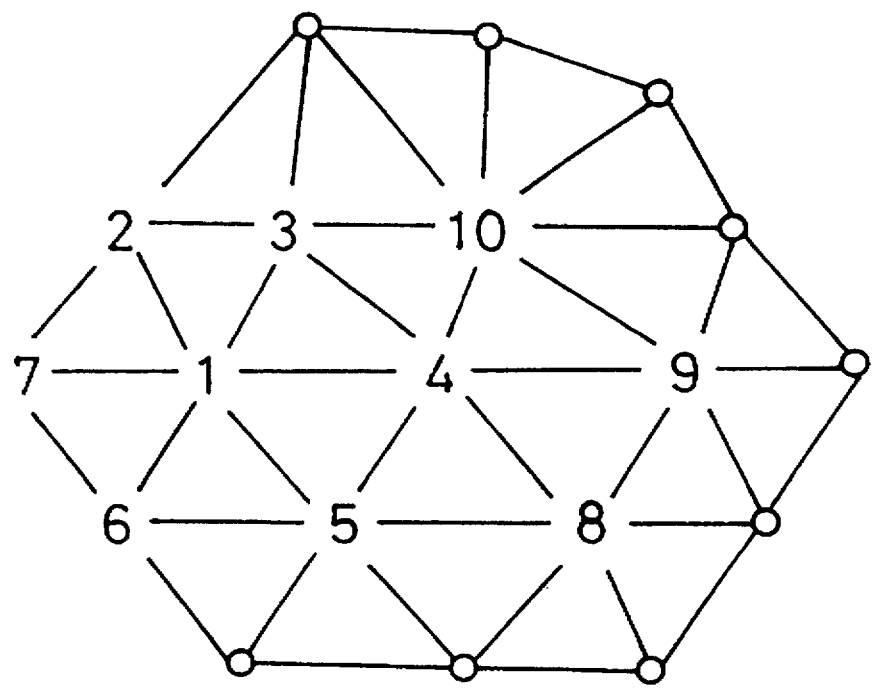
FIG. 31 is a diagram showing the distance interrelation network of the auto-correlation matrices used in the fifth embodiment of the fifth invention.

When the distance interrelation of the auto-correlation matrices corresponding to various transforms is organized into a network as shown in FIG. 31, it is no longer necessary to select the optimum transform matrix from the whole set of available matrices but it is sufficient to search a portion of the matrix set so that the required operation is drastically reduced.

The auto-correlation matrix of an input signal is prepared in an auto-correlation matrix preparation stage 517 and a search is performed by a network searcher 520. The auto-correlation matrices corresponding to coefficients memory have been organized as a network and stored in a memory 518. As shown in FIG. 31, the network has an array of auto-correlation matrices based on the distance relationship.

For example, in the first step, a distance comparison is made between the input and the auto-correlation matrix 1 representing the initial value and adjacent auto-correlation matrices 1 through 7. If matrix 4 is the minimum, then the matrices 1, 5, 8, 9, 10 and 3 adjacent to 4 are searched. If 4 is still found to be the minimum, this can be determined as the optimum transform. Since the matrices are organized into a network according to distances, the problem of local optimization can be avoided. Moreover, the optimum point can be reached quickly as compared with total searching.

In order to perform a search using the network arrangement shown in FIG. 31, a table such as the one illustrated in FIG. 32 may be conveniently prepared beforehand. Thus, all the auto-correlation matrices are given serial numbers and the distance between the auto-correlation matrix of the input signal and matrix 1 (initial value) is determined in the first place and, then, distance comparisons are made with all the auto-correlation matrices in the corresponding right-hand column of the table, namely 2, 3, 4, 5, 6 and 7. Assuming that the distance between input and 4 is the minimum distance, distance comparisons are made with the adjacent auto-correlation matrices 1, 3, 5, 8, 9 and 10 in the corresponding right-hand column. In this operation, the distances to 1, 3 and 5 have already been determined in the first step and, therefore, need not be calculated but the results already obtained can be utilized.

When the distance to an auto-correlation matrix with the number given in the left-hand column is smaller than the distance to any auto-correlation matrix in the corresponding right-hand column, the search is brought to an end. Otherwise, the same sequence is repeated.

Figure 34:
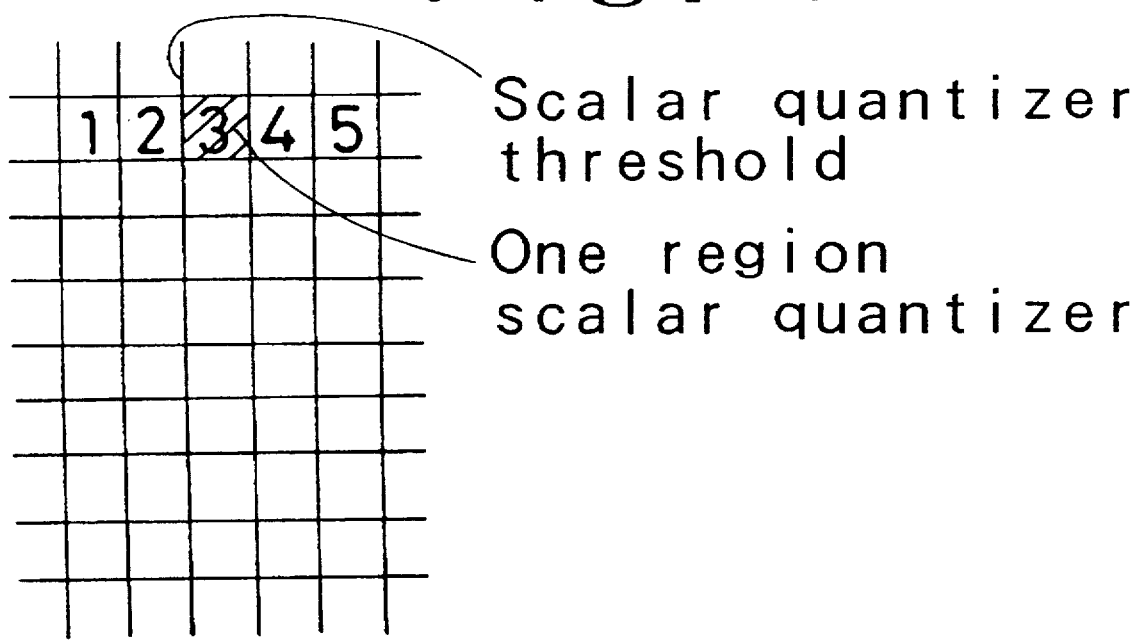
FIG. 34 is a diagram showing a scalar quantized block.

As an alternative network searching technique, the two-step searching method schematically shown in FIG. 34 may be employed. This is a technology developed for the vector quantization of a picture and its prototype is described in Y. Yamada et al.: "Two-step Nearest Neighbor Search Algorithm with Coarse Prequantization", Technical Report of IEICE, IT93-70, pp. 43–48 (1993-12).

As illustrated in FIG. 34, auto-correlation matrices are uniformly scalar-quantized for each dimension and the range of input is confined to approximately one scalar quantization block. Then, a total search is made within this limited narrow range to find the nearest auto-correlation matrix and the matrix of minimum distance is determined.

For a total search within a confined range in the second step, there should be prepared a search table designating auto-correlation matrixes to be searched for each block as illustrated in FIG. 35.

While the minimum distance auto-correlation matrix method has been described as a means for network search, the input matrix as it is can be employed.

Sixth Embodiment

Figure 33:
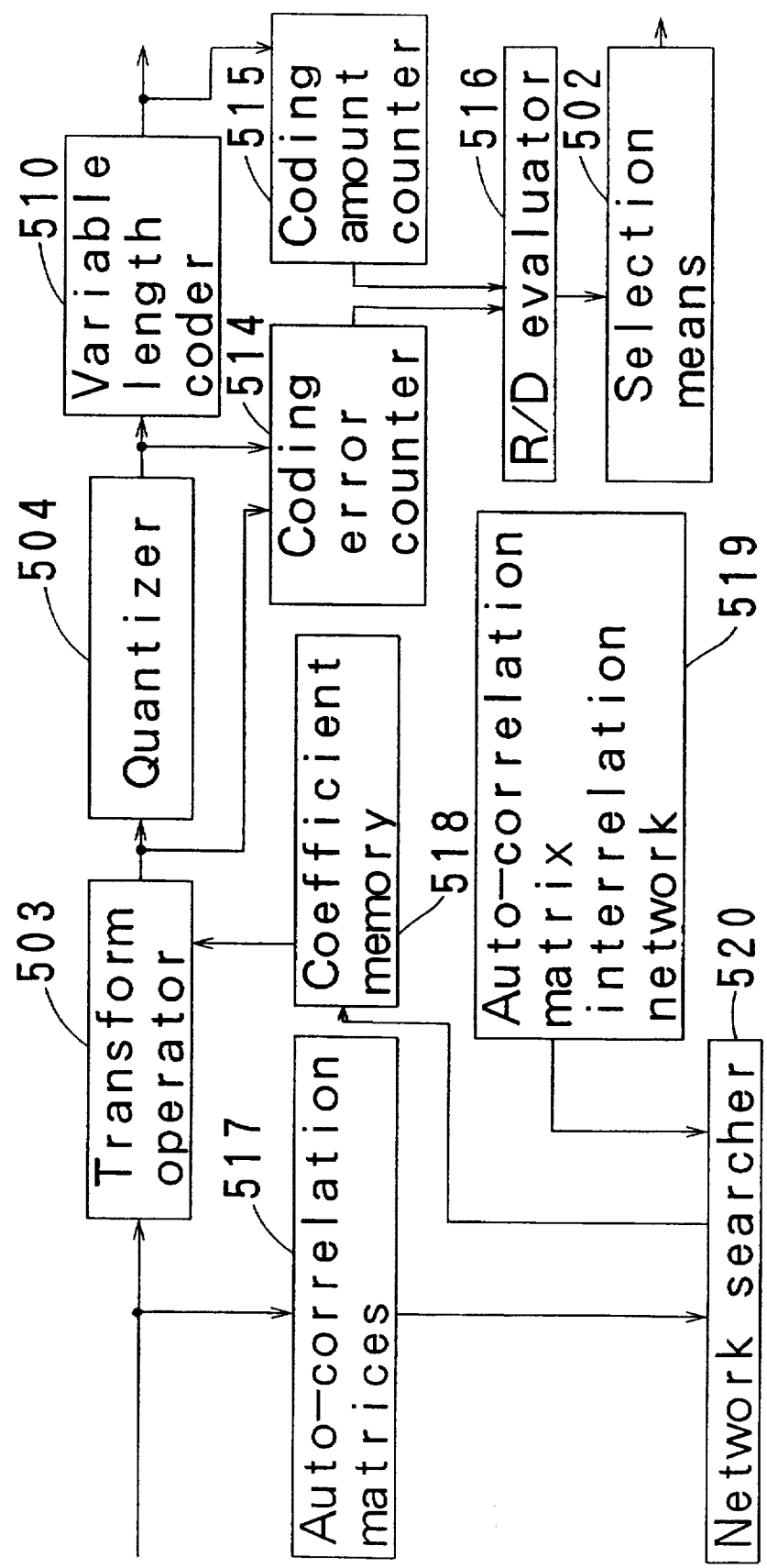
FIG. 33 is a block diagram of a sixth embodiment of the fifth invention.

FIG. 33 is a block diagram of the video encoding apparatus according to a sixth embodiment of this invention.

In this apparatus, the auto-correlation matrix corresponding to the transform at the minimum distance from the auto-correlation matrix of the input is first determined and from the set of regional transforms including the transform corresponding to this auto-correlation matrix, the transform which gives the locally optimum coding result is selected. It is a general combination of the embodiment shown in FIG. 28 and that shown in FIG. 30. On completion of the search in the auto-correlation matrix space, candidates of optimum transformation are selected for, e.g. variable length coding. From this limited number of candidates, the optimum transform is searched from the R/D standpoint.

Referring to the example shown in FIG. 30 and FIG. 31, the minimum distance matrix is selected from the available set of auto-correlation matrices with respect to the auto-correlation matrix of the input signal. This matrix is the optimum matrix in the auto-correlation matrix space but is not necessarily the optimum transform matrix for the whole coding apparatus. Therefore, based on the quasi-optimum transform matrix determined above, the genuinely optimum transform matrix is selected from the rate and distortion points of view in accordance with the embodiment shown in FIG. 28. In this manner, the true optimization can be realized in a short search time.

(Sixth Invention)

Figure 36:
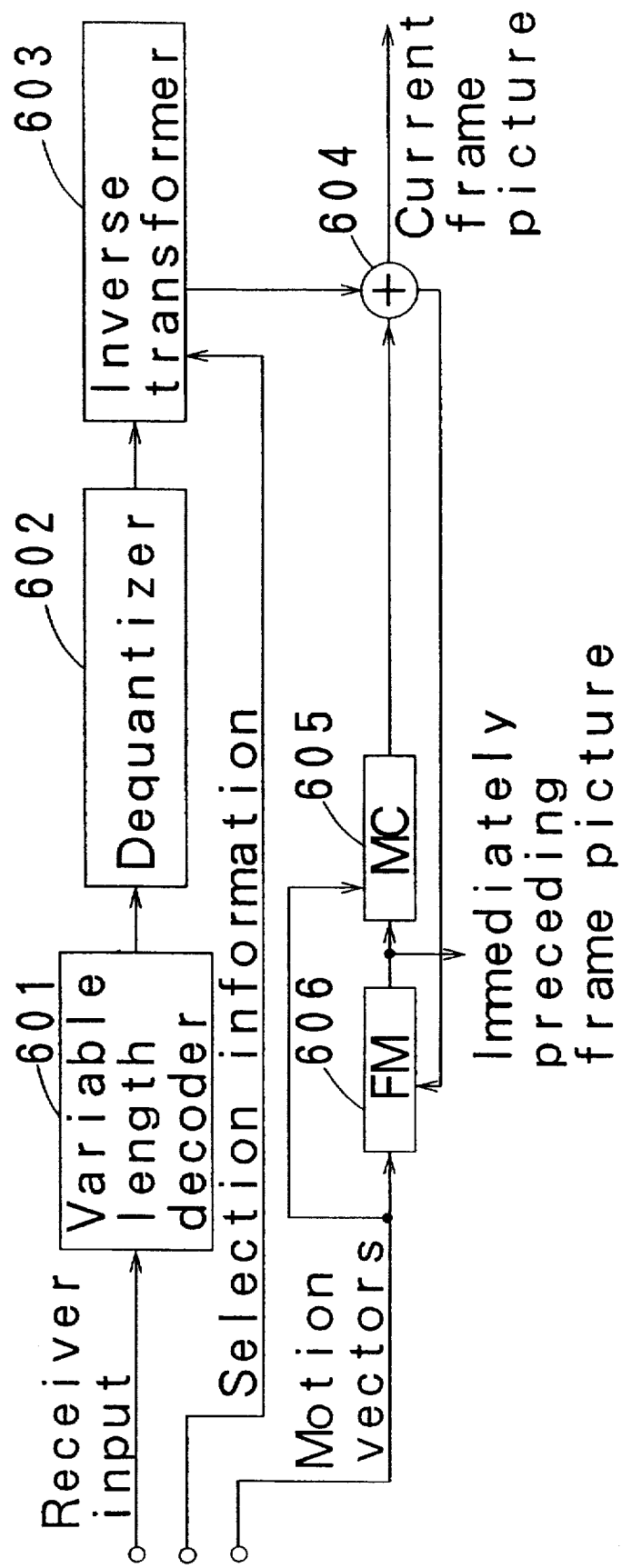
FIG. 36 is a block diagram of the video decoding apparatus according to the sixth invention.

The video decoding apparatus which decodes the data coded by the video encoding apparatus of FIG. 24 is now described with reference to FIG. 36.

The signal input comprises the variable length coded data, the selection information indicating which transform matrix has been selected and the motion vector.

The coded data is decoded in a variable length decoder 601, dequantized by a dequantizer 602 and inverse transformed by an inverse transformer 603. In this operation, the selection information indicating which transform matrix has been selected is supplied and the matrix coefficient designated by the selection information signal is selected from a set of matrix efficients stored in the inverse transformer 603 and subjected to inverse transformation.

The motion vector is applied to a frame memory 606 and the picture of the immediately preceding frame is read out from the frame memory 606.

In a motion compensation circuit 605, a predetermined shift, affine transform or enlargement/contraction is carried out according to the signal from the frame memory 606 and the motion vector.

The immediately preceding frame picture motion-compenrated in the motion compensation circuit 605 and the result of the inverse transform are added in an adder 604 to construct the current frame picture.

It should be understood that the picture of the immediately preceding frame may be taken out from the frame memory 606.

(Seventh Invention)

First Embodiment

Figure 37:
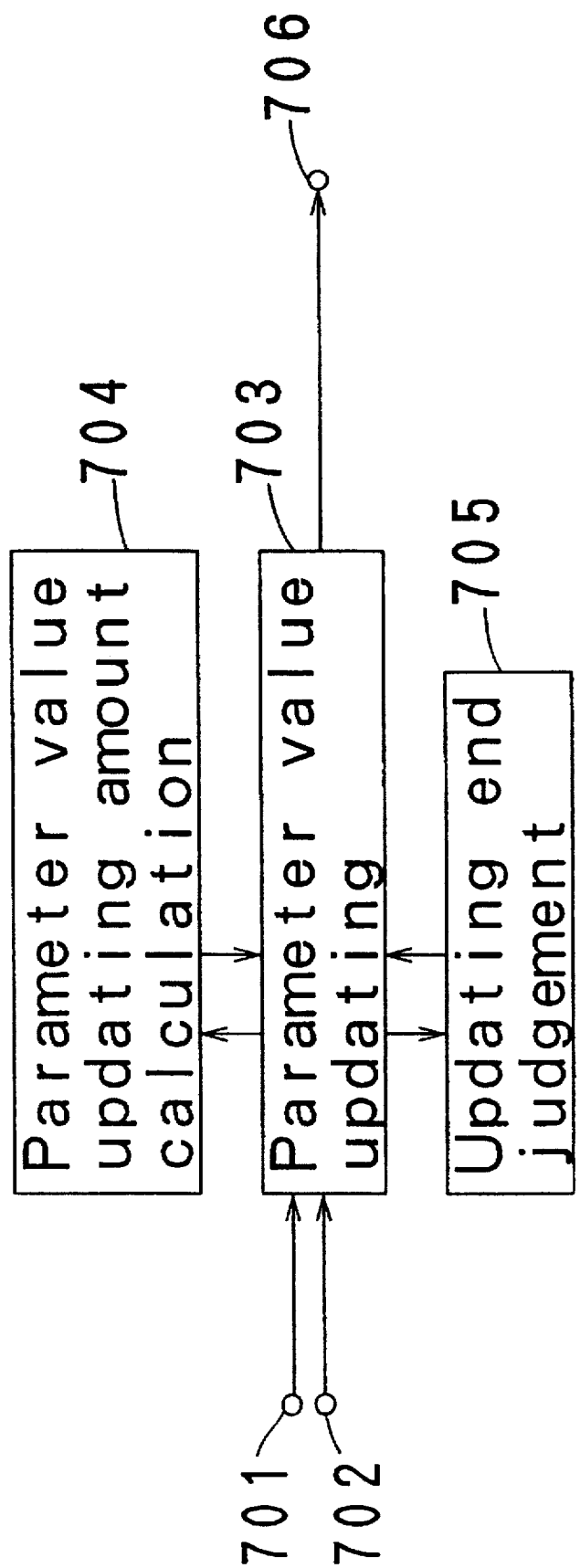
FIG. 37 is a block diagram of the motion estimation apparatus according to a first embodiment of the seventh invention.
Figures 38A, 38B:
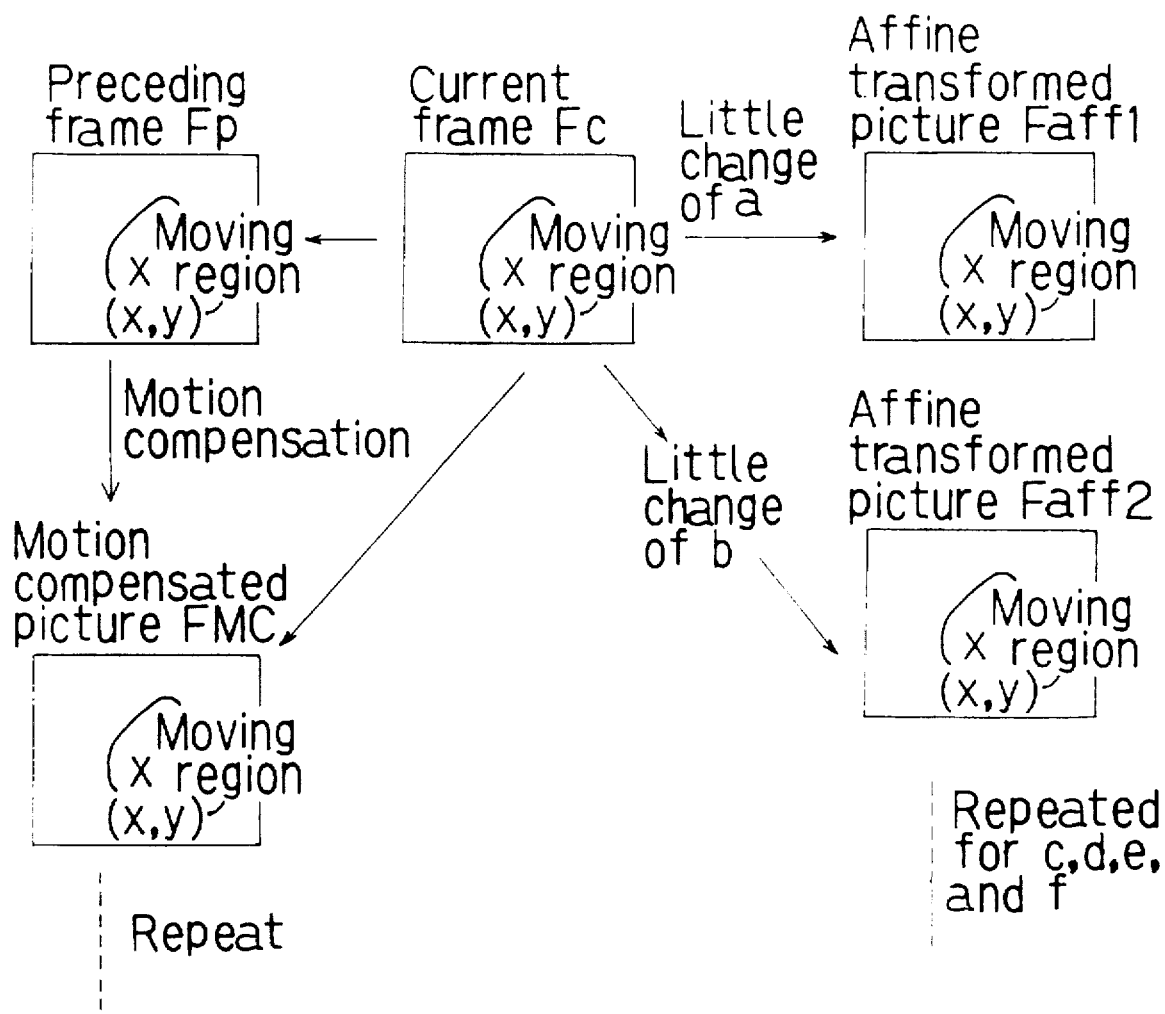
FIGS. 38A and 38B are diagrammatic representations of the determination of affine transform parameter values.

The motion estimation apparatus according to a first embodiment of this invention is now described, reference being had to FIGS. 37, 38A and 38B.

FIG. 37 is a block diagram of the motion estimation apparatus according to one embodiment of this invention.

The picture signal and the motion estimation target area designating signal are applied from input terminals 701 and 702, respectively. As the motion estimation target area, the area corresponding to the face of a character, for instance, is designated.

In a parameter updating stage 703, a motion parameter estimation for the target area is performed according to a predetermined motion expression.

The motion expression may for example be an affine transform mapping of equation (8). Thus, the equivalence between the pixel value at each point (x, y) within the motion estimation target area of the current frame picture and the pixel value of the point (x', y') of the preceding frame picture is expressed by parameters a–f. Here, a–d are parameters expressing a rotation, enlargement, reduction and deformation, and e and f are parameters expressing translation.

$$\begin{pmatrix} x' \\ y' \end{pmatrix} = \begin{pmatrix} a & b \\ c & d \end{pmatrix} \begin{pmatrix} x \\ y \end{pmatrix} + \begin{pmatrix} e \\ f \end{pmatrix} \quad (8)$$

In a parameter value updating amount calculation stage 704, the parameter values are updated so as to diminish the motion-compensated prediction error.

The method of updating may for example be a recursive procedure according to equation (9).

$$P_{i+1} = Pi + \Sigma \frac{g_n(x,y) - g_{n-1}(x'_{pi}, y'_{pi})}{\nabla p g_n} \quad (9)$$

$P_i$ is the parameter value after the ith updating, $g_n$ (x, y) is the pixel value at point (x, y) on the current frame picture, $x'_{pi}$, $Y'_{pi}$ are the coordinate values of position (x, y) as transformed using parameter $P_i$, $g_{n-1}(x'_{pi}, y'_{pi})$ is the pixel value at point $(x'_{pi}, Y'_{pi})$ on the preceding frame picture, and $Pg_n$ is the gradient of pixel values with respect to parameter P of the current frame picture $g_n$.

Σ in the right second term represents the total sum of values for all points in the motion estimation target area.

Thus, the denominator of the right second term indicates the difference in density between the pixel of interest on the current frame picture and the pixel transformed by changing the value of the parameter of interest values by basic units of, for example, +1 (e.g. e is set at +1). The numerator represents the difference in density between the pixel of interest on the current frame picture and the preceding frame pixel with the coordinate values transformed using the current parameter values.

Therefore, the whole of the right second term represents the total sum of the ratios of the density difference, on a parameter basis, of the current frame picture to the density difference between the current frame picture and the preceding frame picture which are relevant to the current parameter values.

Now that the new parameter $P_{i+1}$ has been determined, this value is substituted into the right first term and, in this manner, still new parameters are recursively determined in sequence.

An update end judging stage 705 determines the end of parameter updating, whereupon motion parameters are outputted from an output terminal 706.

The updating may be regarded as being complete, for example when the value of the right second term of equation (9) has decreased below the predetermined threshold level, when the motion compensated prediction error after parameter value updating has increased or when one of them is satisfied at least.

While the total sum of the right second term of equation (9) is determined as above, the same parameters can be obtained by calculating the total sum for each of the denominator and numerator.

The procedure of parameter value updating is now described by taking the computation of the affin transform parameter values as an example, reference being had to FIGS. 38A and 38B.

It is assumed that the value of parameter a is to be determined.

The pixel value at coordinates (x, y) within the same area of the current frame Fc is now assumed to be LFc (x, y).

LFaffl (x, y) is the pixel value of the image Faffl obtained by affine transform of current frame Fc using the value shifted by α from the initial value of a. Then, the value found by dividing the difference in pixel value at the same position between the two images by α can be regarded as the gradient for a at the coordinates (x, y).

$$\alpha = \{LFaffl\ (x,\ y) - LFc\ (x,\ y)\}/\alpha \tag{10}$$

Thus, α represents the amount of change in pixel value when the value of a has changed by 1.

Meanwhile, the amount of change in pixel value from the current frame Fc to the preceding frame Fp is:

$$Diff = \{LFp\ (x,\ y) - LFc\ (x,\ y)\} \tag{11}$$

Therefore, the value of parameter a representing the affine transform from the current frame Fc to the preceding frame Fp can be determined as the value changed from the initial value by Diff/α.

Using the updated value of a, the picture FMC1 derived by motion compensation of the preceding frame Fp is constructed.

Then, the value of parameter b is determined in the same manner as the value of a.

First, picture Faff2 is obtained from the current frame Fc by affine transform using the value of b found by changing from its initial value by α. And from the ratio of the difference in pixel value between Faff2 and Fc to the difference in pixel value between the motion-compensated picture FMC1 and the current frame picture Fc, the necessary amount of change in the parameter value is calculated. Using the updated value of b, a motion-compensated picture FMC2 is constructed.

Similarly the parameter value is calculated for each of c, d, e and f. When an adequate motion prediction cannot be obtained by one operation for one parameter, the operation starting with a is repeated until the difference between the motion-compensated picture and the current frame picture has been sufficiently diminished.

In decoding, the preceding decoded image is motion-compensated according to the transmitted motion parameters. For example, when the motion expression with affine transform is used, the pixel value of coordinates (x, y) within the moving region of the motion compensated picture is the pixel value of coordinates (x', y') determined by affine transform using equation (1) in the preceding decoded image. This operation is carried out for all the pixels in the whole moving region to complete the motion compensation using affine transform.

Second Embodiment

Figure 39:
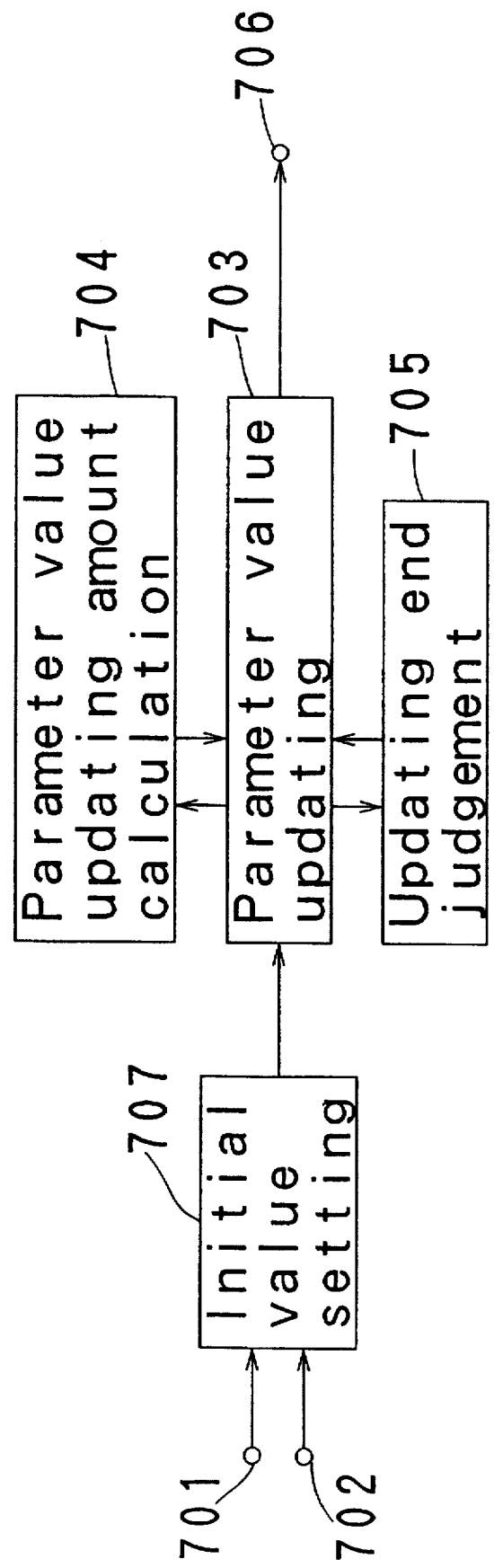
FIG. 39 is a block diagram of a second embodiment of the seventh invention.

FIG. 39 is a block diagram showing a second embodiment of this invention.

The difference from FIG. 37 is that this embodiment includes an initial value setting stage 707.

The initial value setting stage 707 selects initial values for the parameters to be used in the parameter updating stage 703 from among pluralities of candidate initial values. For example taking the above-mentioned motion expression as an example, a, b, c and d are fixed to 1, 0, 0 and 1, respectively, and (0, 0), (−8, 8), (8, −8), (8, 8) and (−8, −8) are used as candidate initial values for e and f. Then, the parameter values conducive to the smallest motion-compensated prediction error are selected as initial values.

Third Embodiment

Figure 40:
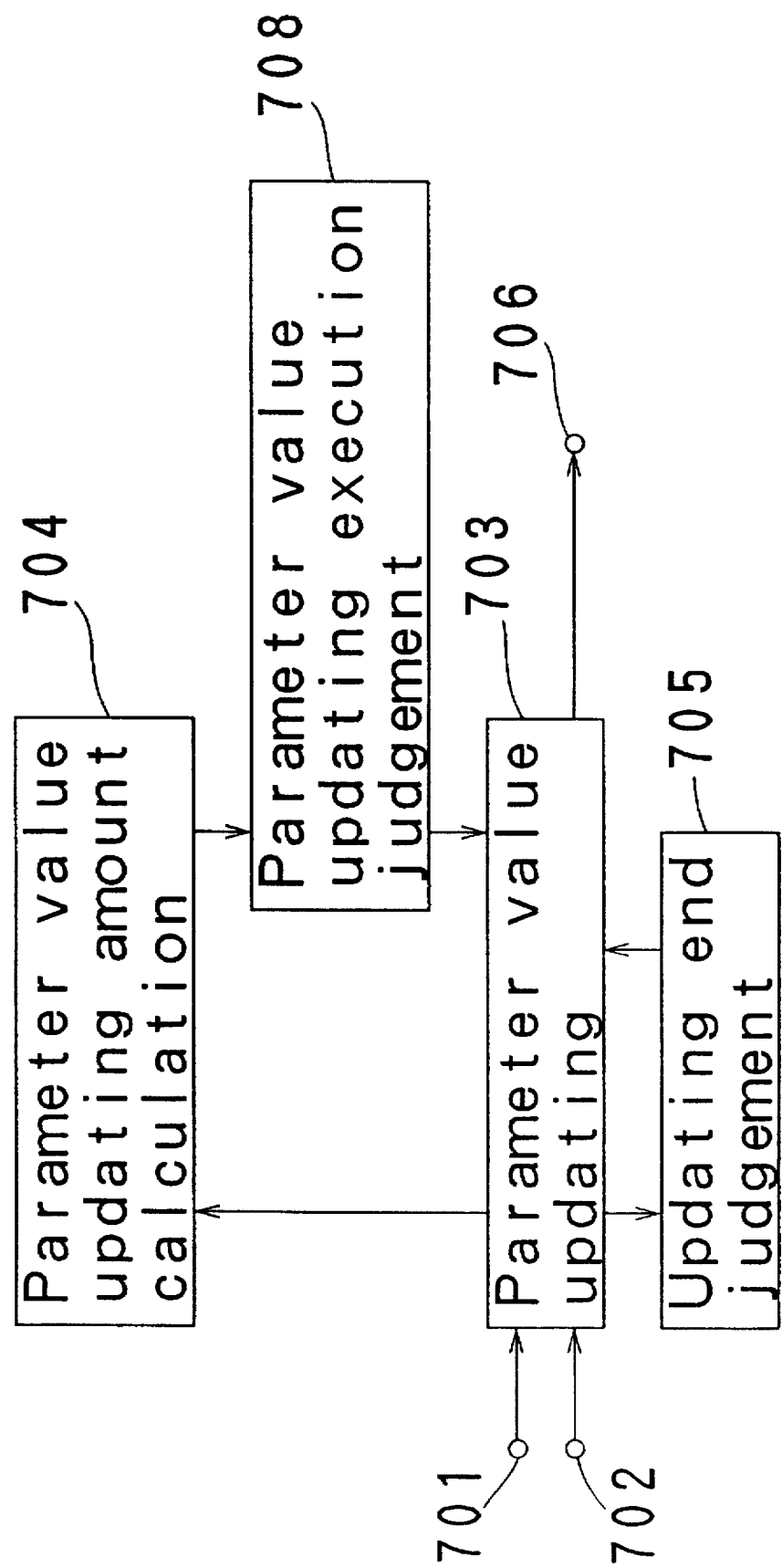
FIG. 40 is a block diagram of a third embodiment of the seventh invention.

FIG. 40 is a block diagram showing a third embodiment of this invention.

The difference from FIG. 37 is the provision of a parameter updating execution judging stage 708.

The parameter updating execution judging stage 708 evaluates, for each parameter, whether parameter updating should be carried out or not in every updating process. The procedure may, for example, be such that no updating is performed if the motion-compensated prediction error will be increased after updating of the parameter.

Fourth Embodiment

Figure 41:
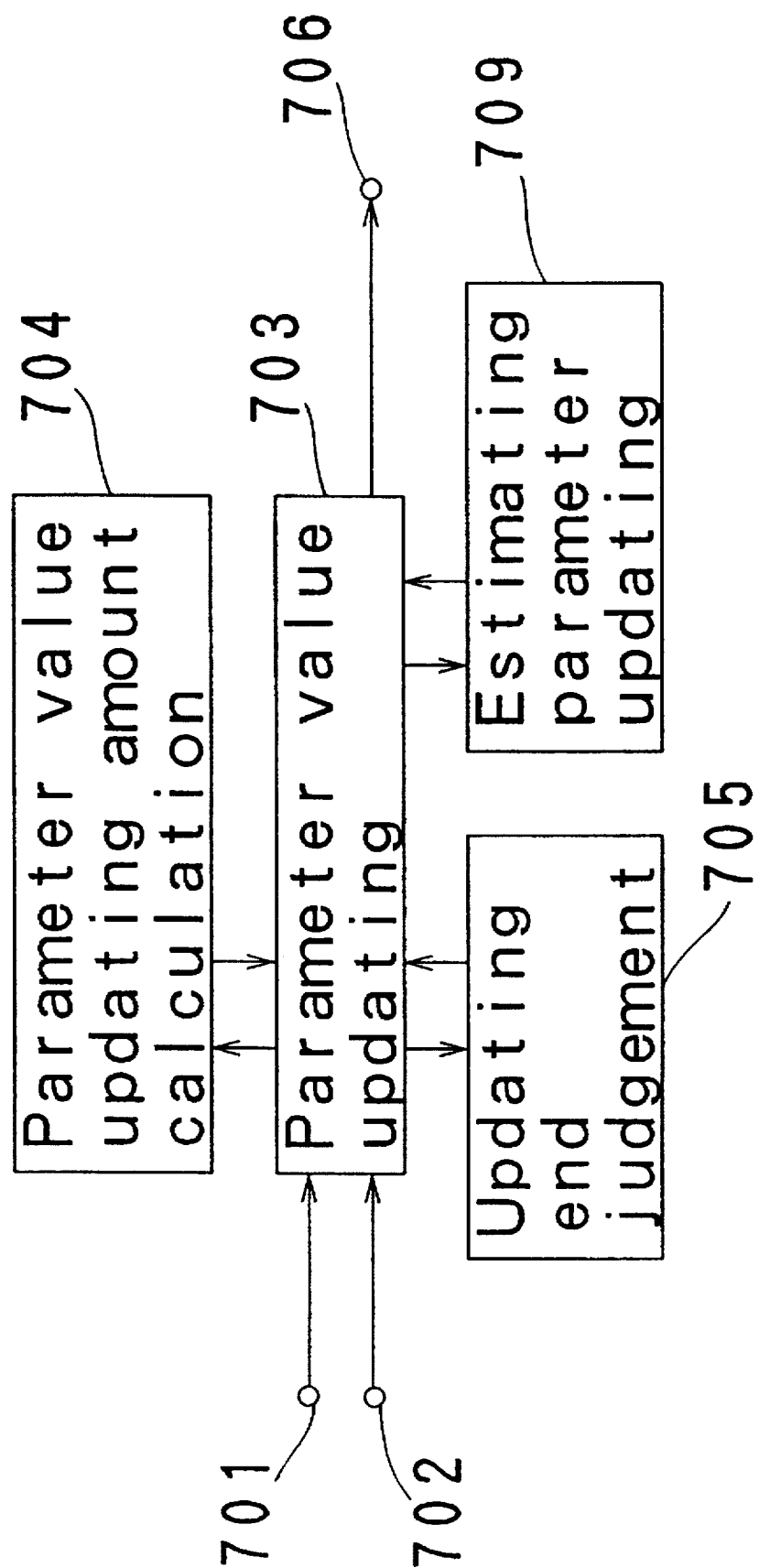
FIG. 41 is a block diagram of a fourth embodiment of the seventh invention.

FIG. 41 is a block diagram showing a fourth embodiment of this invention.

The difference from FIG. 37 is the provision of an estimation parameter updating stage 709.

This estimating parameter updating stage 709 determines the parameter whose value should be updated. Updating of the estimating parameter is generally repeated until values for all the parameters have been updated. This operation is now described in detail taking the above-mentioned motion expression as an example. By taking advantage of the fact that the estimation of parameter values can be carried out in a plurality of stages in this invention, assuming that values of all the parameters a–f can hardly be determined in one step, determinations can be made using the motion expression with a limited affine transform mapping not taking deformation into consideration as shown by equation (12).

$$\begin{pmatrix} x' \\ y' \end{pmatrix} = S \begin{pmatrix} \cos\theta & -\sin\theta \\ \sin\theta & \cos\theta \end{pmatrix} \begin{pmatrix} x \\ y \end{pmatrix} + \begin{pmatrix} e \\ f \end{pmatrix} \tag{12}$$

where θ is a rotation parameter and s is an expansion/reduction parameter.

The order of parameter sets for updating may be

{θ, e, f}→{θ, s, e, f}→{a, b, c, d, e, f}

Fifth Embodiment

Figure 42:
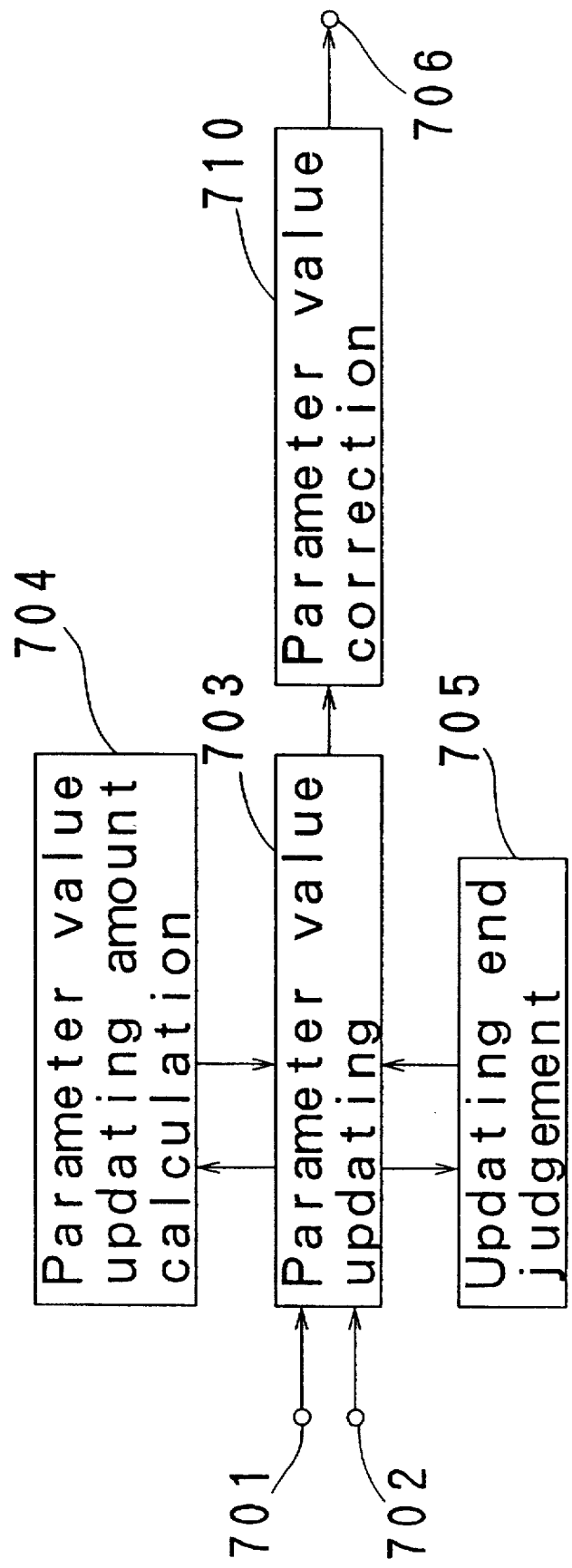
FIG. 42 is a block diagram of a fifth embodiment of the seventh invention.
Figure 43:
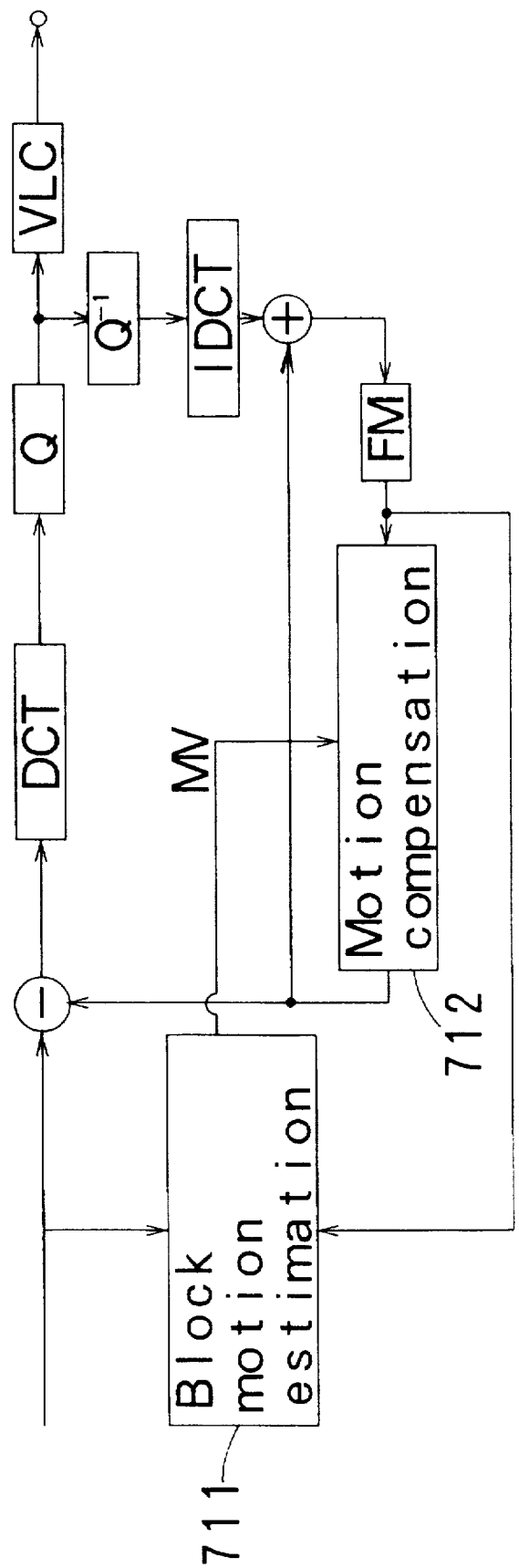
FIG. 43 is a block diagram showing a prior art motion compensated interframe predictive coding method.
Figure 44:
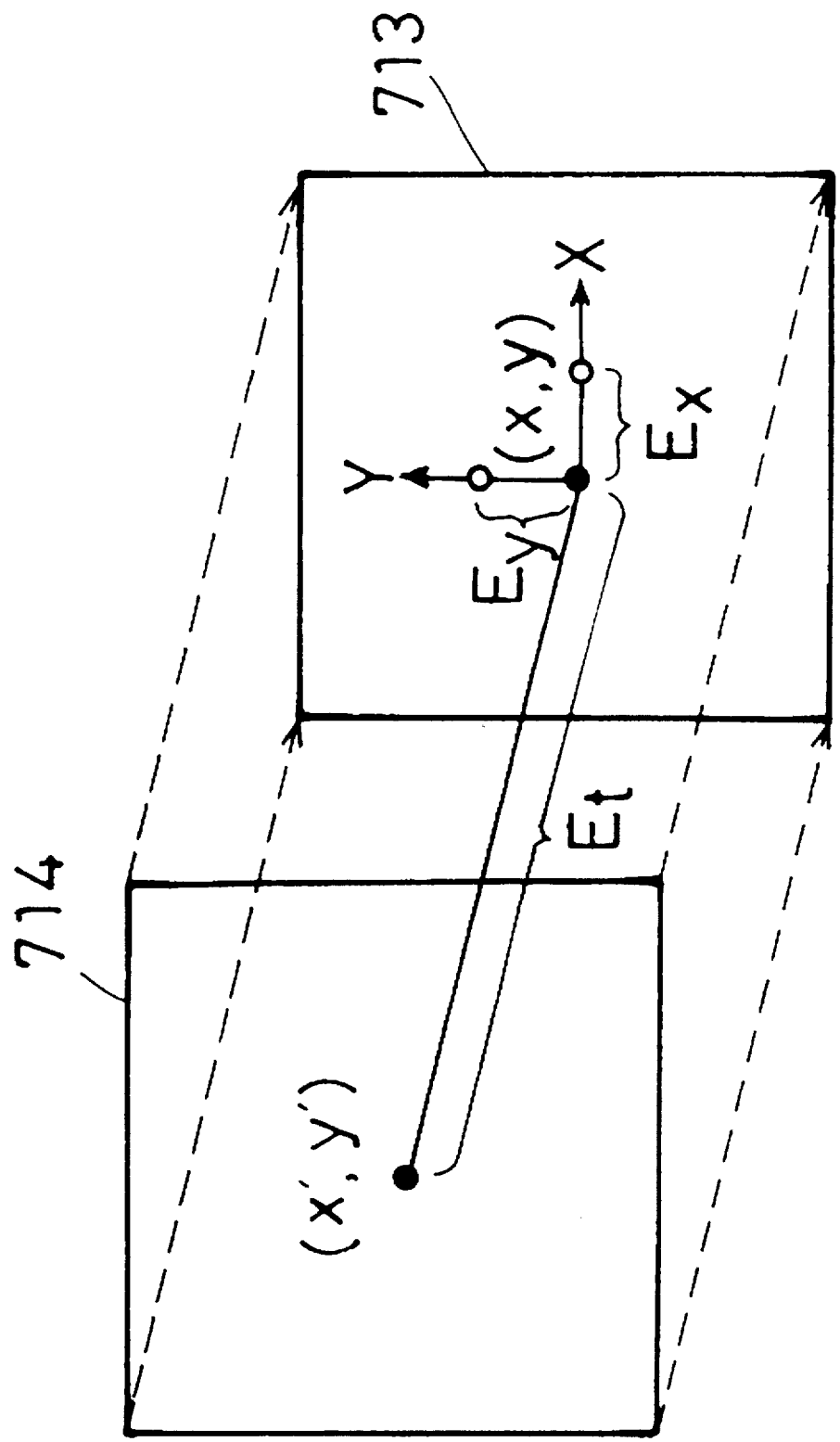
FIG. 44 is a diagram describing the conventional gradient method.

FIG. 42 is a block diagram showing a fifth embodiment of this invention.

The difference from FIG. 37 is the provision of a parameter value correction stage 710.

The parameter value correction stage 710 searches for parameter values which insure smaller motion-compensated prediction errors by fine adjustment of updated parameter values.

The method for search for example be as follows. The parameter value is little-changed in + and − directions to determine the motion-compensated prediction errors and if the + direction error is smaller, the parameter value is further changed in the + direction and the motion-compensated prediction error at each step is determined. As a gain in motion-compensated prediction error is found, the parameter with the smallest error up to that point is outputted as the corrected value.

What is claimed is:

1. A video encoding apparatus comprising:

a moving region analyzing means for extracting a moving region from an input video signal, analyzing its motion and outputting a residual signal relative to a reconstructed two-dimensional picture and motion parameters;

a residual coding means for encoding said residual signal from said moving region analyzing means to form encoded residual data;

a reconstruction means for creating the reconstructed picture using said motion parameters from said moving region analyzing means and said encoded residual data from said residual coding means; and a variable length coding means for performing a variable length coding of said motion parameters from said moving region analyzing means and said encoded residual data from said residual coding means;

wherein said moving region analyzing means comprises:

a global motion estimating means for estimating global motion parameters of the moving region;

a polygonal patch motion estimating means for estimating polygonal patch motion parameters for local motions within the moving region by applying polygonal patches to the moving region using the global motion parameters estimated by said global motion estimating means; and a motion compensating means for performing a motion compensation of the reconstructed picture using the global motion parameters estimated by said global motion estimating means and the polygonal patch motion parameters estimated by said polygonal patch motion estimating means.

2. A video decoding apparatus comprising:

a variable length decoding means for receiving variable length-coded data, decoding the coded data and resolving it into a global motion parameter, polygonal patch motion parameters and a global motion parameter, polygonal patch motion parameters and a residual code;

a residual code decoding means for decoding the residual code from said variable length decoding means and outputting a residual signal;

a global motion compensating means for performing a motion compensation of an entire moving region using a decoded picture of a preceding frame stored in a frame memory and the global motion parameter output from said variable length decoding means and outputting a global motion compensated image;

a polygonal patch compensating means for performing a local motion compensation within the moving region using the global motion compensated image output from said global motion compensating means and the polygonal patch motion parameter output from said variable length decoding means and outputting a motion compensated prediction image; and an adding means for adding the motion compensated prediction image from said polygonal patch compensating means and the residual code output from said residual code decoding means to construct a decoded picture and outputting the decoded picture to a frame memory.

3. A video encoder/decoder system comprising:

a video encoding apparatus, including a moving object analyzing means for extracting a moving object from an input video signal, analyzing its motion and outputting a residual signal relative to a reconstruction picture and motion parameters, a residual coding means for encoding said residual signal from said moving object analyzing means to form encoded residual data, a reconstruction means for reconstructing a picture image using said motion parameters from said moving object analyzing means and said encoded residual data from said residual coding means, and a variable length coding means for performing a variable length coding of said motion parameters from said moving object analyzing means and said encoded residual data from said residual coding means to produce variable length-coded data, wherein said moving object analyzing means comprises a global motion estimating means for estimating a global motion parameter of the moving region within the input picture, a polygonal patch motion estimating means for estimating polygonal patch motion parameters by applying polygonal patches to the moving region within the input picture or reconstructed picture, and a motion compensating means for performing a motion compensation of the reconstructed picture using the global motion parameter estimated by said global motion estimating means and the polygonal patch motion parameters estimated by said polygonal patch motion estimating means; and a video decoding apparatus including a variable length decoding means for receiving the variable length-coded data, decoding and resolving the variable length-coded data into the global motion parameter, the polygonal patch motion parameters and a residual code, residual code decoding means for decoding the residual code from said variable length decoding means and outputting a decoded residual signal, a global motion compensating means for performing a motion compensation of the entire moving region using the decoded picture of a preceding frame stored in a frame memory and the global motion parameter output from said variable length decoding means and outputting a global motion compensated image, a polygonal patch compensating means for performing a local motion compensation within the moving region using the global motion compensated image output from said global motion compensating means and the polygonal patch motion parameter output from said variable length decoding means and outputting a motion compensated prediction image, and an adding means for adding the motion compensated prediction image from said polygonal patch compensating means and the residual code output from said residual code decoding means to construct a decoded picture and outputting the decoded picture to a frame memory.

* * * * *

UNITED STATES PATENT AND TRADEMARK OFFICE
CERTIFICATE OF CORRECTION

PATENT NO. : 5,592,228
DATED : January 07, 1997
INVENTOR(S) : Kenshi DACHIKU et al.

It is certified that error appears in the above-indentified patent and that said Letters Patent is hereby corrected as shown below:

Title page, item [57], in the Abstract, line 1, after "apparatus", insert --for--.

Title page, item [57], in the Abstract, line 2, after "analyzer", insert --,--.

Claim 2, column 23, lines 44-45, after "parameters and", delete "a global motion parameter, polygonal patch motion parameters and".

Signed and Sealed this

Fifteenth Day of July, 1997

Attest:

BRUCE LEHMAN

*Attesting Officer*     *Commissioner of Patents and Trademarks*